United States Patent
Towal

(10) Patent No.: US 10,366,430 B2
(45) Date of Patent: Jul. 30, 2019

(54) SYSTEMS AND METHODS FOR CUSTOMIZING AMENITIES IN SHARED VEHICLES

(71) Applicant: QUALCOMM Incorporated, San Diego, CA (US)

(72) Inventor: Regan Blythe Towal, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 402 days.

(21) Appl. No.: 15/425,771

(22) Filed: Feb. 6, 2017

(65) Prior Publication Data
US 2018/0225734 A1    Aug. 9, 2018

(51) Int. Cl.
G06Q 30/06     (2012.01)
G06Q 10/06     (2012.01)
G06Q 50/10     (2012.01)

(52) U.S. Cl.
CPC ......... *G06Q 30/0621* (2013.01); *G06Q 10/06* (2013.01); *G06Q 10/0631* (2013.01); *G06Q 30/0645* (2013.01); *G06Q 50/10* (2013.01)

(58) Field of Classification Search
None
See application file for complete search history.

(56) References Cited

U.S. PATENT DOCUMENTS

| | | | | |
|---|---|---|---|---|
| 5,729,471 A | * | 3/1998 | Jain | H04N 13/139 725/131 |
| 5,995,651 A | * | 11/1999 | Gelenbe | G06K 9/66 382/155 |
| 8,271,309 B2 | * | 9/2012 | Stephens | G06Q 30/0645 705/27.1 |
| 9,495,594 B2 | * | 11/2016 | Rosario | G06K 9/00624 |
| 9,547,807 B2 | * | 1/2017 | Vidal Calleja | G06K 9/4676 |
| 9,858,496 B2 | * | 1/2018 | Sun | G06N 3/084 |

(Continued)

FOREIGN PATENT DOCUMENTS

| | | | | |
|---|---|---|---|---|
| GB | 2459043 A | 10/2009 | | |
| WO | WO-2008081143 A3 | * | 10/2008 | G06K 9/627 |

OTHER PUBLICATIONS

Kuemmerling M., et al., "Towards Seamless Mobility: Individual Mobility Profiles to Ease the Use of Shared Vehicles", 12th IFAC Symposium on Analysis, Design, and Evaluation of Human-Machine Systems, Aug. 11-15, 2013, pp. 450-454.

(Continued)

*Primary Examiner* — Nicholas D Rosen
(74) *Attorney, Agent, or Firm* — Austin Rapp & Hardman, P.C.

(57) ABSTRACT

A method performed by an electronic device is described. The method includes obtaining an auxiliary product request or an auxiliary service request in conjunction with a vehicle request. The method also includes obtaining image data from an interior of at least one vehicle. The method further includes performing computer vision analysis on the image data, including processing the image data to classify one or more objects within a scene of the interior of the at least one vehicle. The method additionally includes determining, based on the classification, whether the one or more objects satisfy the auxiliary product request or the auxiliary service request within the interior of the at least one vehicle.

30 Claims, 10 Drawing Sheets

(56) References Cited

U.S. PATENT DOCUMENTS

| | | | |
|---|---|---|---|
| 9,870,649 B1* | 1/2018 | Fields | G08G 1/096791 |
| 10,013,620 B1* | 7/2018 | Sanchez | G06K 9/00845 |
| 10,147,008 B1* | 12/2018 | Chan | G06K 9/00845 |
| 10,218,771 B2* | 2/2019 | Penilla | G06F 17/00 |
| 10,242,513 B1* | 3/2019 | Fields | G08G 1/096791 |
| 2002/0186144 A1* | 12/2002 | Meunier | G07B 15/00 |
| | | | 340/4.6 |
| 2007/0239494 A1* | 10/2007 | Stephens | G06Q 10/02 |
| | | | 705/5 |
| 2008/0183535 A1* | 7/2008 | Kahana | G06Q 30/06 |
| | | | 705/37 |
| 2009/0116698 A1* | 5/2009 | Zhang | G06K 9/00362 |
| | | | 382/111 |
| 2014/0207312 A1 | 7/2014 | Rouyer et al. | |
| 2014/0254923 A1* | 9/2014 | Vidal Calleja | G06K 9/4676 |
| | | | 382/159 |
| 2014/0278767 A1 | 9/2014 | Heron et al. | |
| 2015/0023553 A1* | 1/2015 | Rosario | G06K 9/00624 |
| | | | 382/103 |
| 2016/0046300 A1 | 2/2016 | Wingfield et al. | |
| 2016/0173568 A1* | 6/2016 | Penilla | G06F 17/00 |
| | | | 709/217 |
| 2016/0239893 A1 | 8/2016 | Kosseifi et al. | |
| 2016/0247096 A1 | 8/2016 | Scicluna et al. | |
| 2017/0206431 A1* | 7/2017 | Sun | G06N 3/084 |
| 2018/0229737 A1* | 8/2018 | Towal | G05D 1/0088 |

OTHER PUBLICATIONS

International Search Report and Written Opinion—PCT/US2017/063392—ISA/EPO—dated Feb. 26, 2018.

* cited by examiner

SYSTEMS AND METHODS FOR CUSTOMIZING AMENITIES IN SHARED VEHICLES

FIELD OF DISCLOSURE

The present disclosure relates generally to electronic devices. More specifically, the present disclosure relates to systems and methods for customizing amenities in shared vehicles.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions, perform richer functions, and/or that perform functions faster, more efficiently, and/or more reliably are often sought after.

Advances in technology have resulted in smaller and more powerful electronic devices. For example, there currently exist a variety of electronic devices such as cellular phones, smartphones, vehicle in-dash electronics, laptop computers, servers, etc.

Users often value convenience, flexibility, and quick service. However, some offerings may be limited. As can be observed from this discussion, improving user experience and/or convenience may be beneficial.

SUMMARY

A method performed by an electronic device is described. The method includes obtaining an auxiliary product request or an auxiliary service request in conjunction with a vehicle request. The method also includes obtaining image data from an interior of at least one vehicle. The method further includes performing computer vision analysis on the image data, including processing the image data to classify one or more objects within a scene of the interior of the at least one vehicle. The method additionally includes determining, based on the classification, whether the one or more objects satisfy the auxiliary product request or the auxiliary service request within the interior of the at least one vehicle.

The method may include determining an auxiliary product inventory or auxiliary service data based on the computer vision analysis. The auxiliary product inventory may indicate one or more items that are consumable by a passenger. An auxiliary product inventory may indicate one or more auxiliary product types.

The method may include determining whether an auxiliary product inventory of the at least one vehicle satisfies the auxiliary product request. The method may also include assigning a vehicle of the at least one vehicle to fulfill the vehicle request in a case that the auxiliary product inventory satisfies the auxiliary product request.

The method may include obtaining auxiliary service data associated with the at least one vehicle. The method may also include determining whether the auxiliary service data of the at least one vehicle satisfies the auxiliary service request. The method may further include assigning a vehicle of the at least one vehicle to fulfill the vehicle request in a case that the auxiliary service data satisfies the auxiliary service request.

The at least one vehicle may include multiple vehicles. The method may include ranking the vehicles based on an auxiliary product inventory or auxiliary service data.

The method may include obtaining the vehicle request with the auxiliary product request, a destination, and a time constraint. The method may also include obtaining vehicle availability data and vehicle location for each of the vehicles. Ranking the vehicles may be further based on the auxiliary product request, the destination, and the time constraint. The method may further include determining whether any of the vehicles satisfies the auxiliary product request and the time constraint. The method may additionally include providing one or more options in a case that none of the vehicles satisfies the auxiliary product request or the time constraint. The method may also include assigning a vehicle based on the vehicle location in a case that one or more of the vehicles satisfies the auxiliary product request and the time constraint.

The method may include monitoring an auxiliary product inventory based on computer vision by detecting addition or removal of one or more auxiliary products. The method may also include updating the auxiliary product inventory based on the addition or removal of the one or more auxiliary products. An auxiliary product inventory may indicate at least one of auxiliary product type, auxiliary product quantity, and auxiliary product quality.

An electronic device is also described. The electronic device includes a processor. The electronic device also includes memory in electronic communication with the processor. The electronic device further includes instructions stored in the memory. The instructions are executable to obtain an auxiliary product request or an auxiliary service request in conjunction with a vehicle request. The instructions are also executable to obtain image data from an interior of at least one vehicle. The instructions are further executable to perform computer vision analysis on the image data, including processing the image data to classify one or more objects within a scene of the interior of the at least one vehicle. The instructions are additionally executable to determine, based on the classification, whether the one or more objects satisfy the auxiliary product request or the auxiliary service request within the interior of the at least one vehicle.

A non-transitory tangible computer-readable medium storing computer executable code is also described. The computer-readable medium includes code for causing an electronic device to obtain an auxiliary product request or an auxiliary service request in conjunction with a vehicle request. The computer-readable medium also includes code for causing the electronic device to obtain image data from an interior of at least one vehicle. The computer-readable medium further includes code for causing the electronic device to perform computer vision analysis on the image data, including code for causing the electronic device to process the image data to classify one or more objects within a scene of the interior of the at least one vehicle. The computer-readable medium additionally includes code for causing the electronic device to determine, based on the classification, whether the one or more objects satisfy the auxiliary product request or the auxiliary service request within the interior of the at least one vehicle.

An apparatus is also described. The apparatus includes means for obtaining an auxiliary product request or an auxiliary service request in conjunction with a vehicle request. The apparatus also includes means for obtaining image data from an interior of at least one vehicle. The apparatus further includes means for performing computer vision analysis on the image data, including means for processing the image data to classify one or more objects within a scene of the interior of the at least one vehicle. The apparatus additionally includes means for determining, based on the classification, whether the one or more objects satisfy the auxiliary product request or the auxiliary service request within the interior of the at least one vehicle.

DETAILED DESCRIPTION

Figure 1:
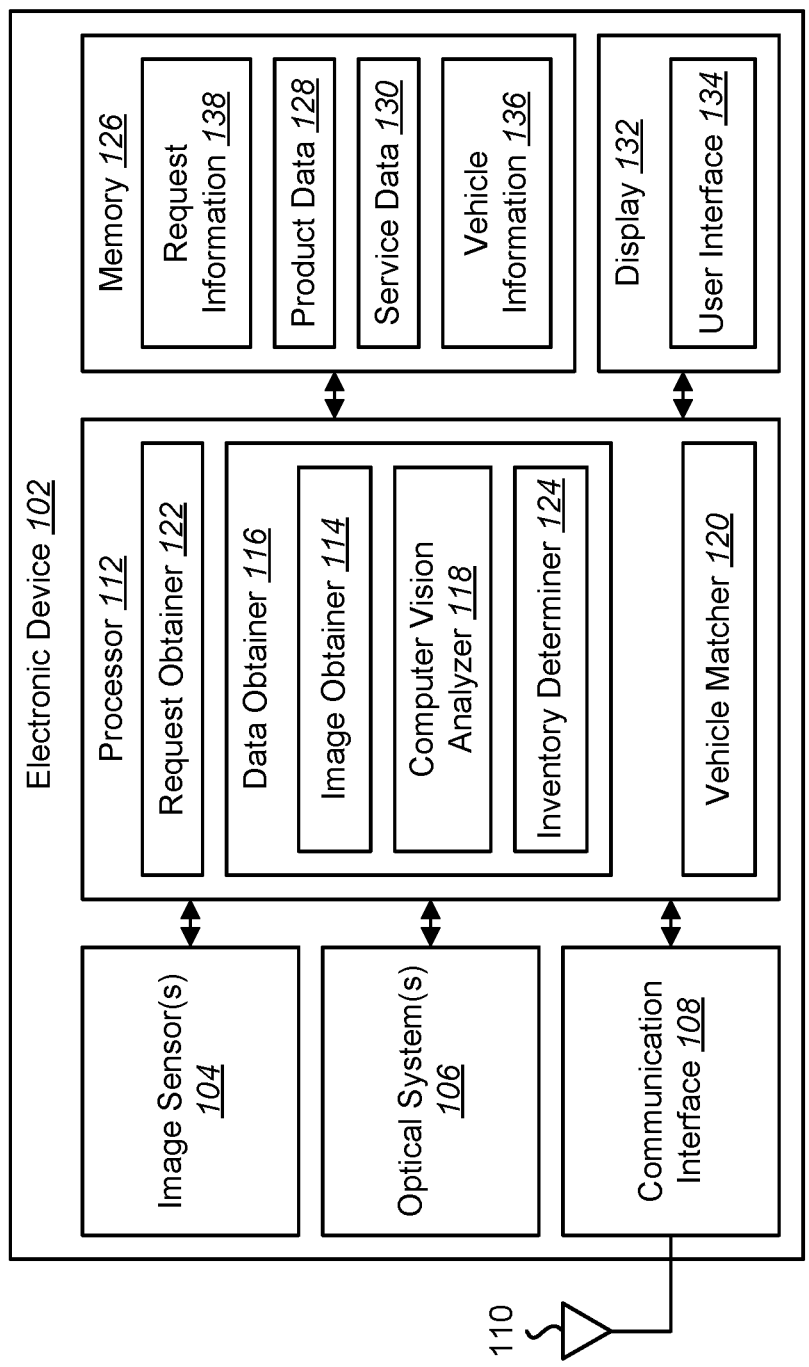
FIG. 1 is a block diagram illustrating one example of an electronic device in which systems and methods for customizing amenities in shared vehicles may be implemented.

The systems and methods disclosed herein may relate to customizing vehicle amenities. For example, some configurations of the systems and methods disclosed herein may enable mobile productivity by providing approaches for customizing auxiliary product and/or auxiliary service options in shared vehicles. The term "auxiliary" as used herein may mean "non-primary." For example, auxiliary products and/or auxiliary services in the context of vehicle service may exclude the class of vehicle, brand/provider, and/or destination. For instance, an auxiliary service may not include a primary service of taking a passenger from point A to point B in a car of X type by Y provider. Instead, auxiliary products and/or auxiliary services may include variable features within a type of vehicle that can optionally be consumed in conjunction with the primary service.

Many people eat, drink, and/or work in their cars. Whether because of a late start to their commute or long road trip, people often consume beverages, snacks, and/or entire meals while driving or riding in their cars in addition to working. In a world where cars, autonomous, semi-autonomous, or manually driven, are shared and summoned by people, providing food service and/or other productivity services to drivers and/or passengers is a capability that may involve logistical, monetary, hygienic, and/or privacy challenges.

Cars may be summoned that provide food (e.g., a food delivery service, pizza delivery, etc.) or that provide transportation (e.g., an Uber vehicle, taxi, etc.), but not both. Some premium vehicles may provide a small number of predetermined offerings like peanuts and water bottles (e.g., the same offerings in each vehicle). Moreover, there may be no options for summoning cars with productivity equipment like printers or Wi-Fi. While it may be possible to hire a car for transportation and then have the car take the passengers to a location to acquire food or to make copies, for example, this takes time and may involve traveling far off the shortest distance route to the passenger's ultimate destination. There may be no large scale service that provides both transportation and personalized (e.g., on demand) food and/or productivity service.

Some configurations of the systems and methods disclosed herein may provide a framework for providing customized (e.g., on demand) food and/or productivity service in a shared vehicle that addresses the logistical challenges involved in this type of service. For example, the framework may include made-to-order food, beverage service, and/or productivity service within the vehicle. Some configurations of the systems and methods disclosed herein may be utilized in entertainment and productivity applications. Some configurations of the systems and methods disclosed herein may be implemented in land-based vehicles (e.g., automobiles, cars, trucks, non-aircraft, etc.). Other configurations may be implemented in other kinds of vehicles (e.g., aircraft).

In some approaches, one or more vehicles (e.g., cars) may be equipped with food and beverage options and/or or other preparation equipment with a variety of food and beverage options stocked ahead of time. For example, the preparation equipment, a stock of ingredients (e.g., food and/or beverage items), and/or supplies may be provided in each vehicle. The food and/or beverage options may be automatically monitored and/or periodically restocked. It should be noted that stocking is not limitless due to a defined volume/cargo space in each vehicle. Accordingly, no provider may be able to accommodate all possible requests. It should also be noted that in some approaches, autonomous vehicles may be leased out during the day by owners on an individual basis and may be differently stocked than large fleets. In any case, earlier passengers may deplete an entire stock of a common ingredient (e.g., bread), which may result in a significant variance between available vehicles at any given moment.

The preparation equipment may scale from an automatic coffee machine to a full service kitchen. Other productivity equipment may range from a color copier to a business center. The equipment may be operated by the passenger or a dedicated other person or robot within the vehicle.

Some configurations of the systems and methods disclosed herein may utilize computer vision in order to monitor items (e.g., food, beverages, other items, etc.) for inventory control. For example, by mounting one or more cameras in the cabin and/or cargo areas, computer vision may be utilized to determine the contents without the need for additional sensors and/or systems that track inventory or consumption. Accordingly, computer vision may provide a powerful and/or flexible solution for monitoring.

Vehicles (e.g., cars) may be selected based on a passenger's desire to have made-to-order food and/or beverages, and/or to perform certain tasks along their trip. When a passenger summons a vehicle, their food, beverage, and/or productivity preferences may be input as well as their destination. When the dispatch algorithm pairs a vehicle with a passenger, the decision on which vehicle to send may be made based not only on the location-based information, but also on the quantity of the food, beverages, and/or preparation equipment that match the passenger's preferences. Vehicles may be selected based on individual products (e.g., a kind of soda), individual brands (e.g., beverage brands, restaurant names, etc.) or based on a type of cuisine (e.g., vegetarian, Italian, Chinese, Mexican, Indian, etc.). Payment could be in the form of a subscription fee or per-item based on consumption in the car.

For example, a passenger may summon a "bar car" on their way from the office to make themselves a cocktail on their way home. Or, a family may summon a "sandwich car" so they could make sandwiches for themselves on a trip to the beach because they did not have time to make them before leaving the house. Or, a user may need to print out some flyers on their way to a meeting and may summon a "business center car." In another example, a user may be late for work and may not have time for breakfast and may summon a "coffee car."

In some configurations, the systems and methods disclosed herein may also apply to arbitrary customizations. For example, the framework may apply to vehicle customization in addition to food and/or productivity services. For instance, vehicles with certain types of seats (leather or cloth), scents (through air fresheners), configurations (seats facing each other rather that facing forward), etc., may be selected in accordance with the framework.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of an electronic device 102 in which systems and methods for customizing amenities in shared vehicles may be implemented. Examples of the electronic device 102 include cellular phones, smart phones, computers (e.g., desktop computers, laptop computers, etc.), servers, tablet devices, media players, televisions, vehicles (e.g., cars, trucks, aircraft, motorcycles, etc.), automobiles, cameras, video camcorders, digital cameras, personal cameras, action cameras, surveillance cameras, mounted cameras, connected cameras, robots, aircraft, gaming consoles, personal digital assistants (PDAs), set-top boxes, etc. The electronic device 102 may include one or more components or elements. One or more of the components or elements may be implemented in hardware (e.g., circuitry) or a combination of hardware and software (e.g., a processor with instructions).

In some configurations, the electronic device 102 may include a processor 112, a memory 126, a display 132, one or more image sensors 104, one or more optical systems 106, and/or a communication interface 108. The processor 112 may be coupled to (e.g., in electronic communication with) the memory 126, display 132, image sensor(s) 104, optical system(s) 106, and/or communication interface 108. It should be noted that one or more of the elements illustrated in FIG. 1 may be optional. In particular, the electronic device 102 may not include one or more of the elements illustrated in FIG. 1 in some configurations. For example, the electronic device 102 may or may not include an image sensor 104 and/or optical system 106. Additionally or alternatively, the electronic device 102 may or may not include a display 132.

In some configurations, the electronic device 102 may present a user interface 134 on the display 132. For example, the user interface 134 may enable a user to interact with the electronic device 102. In some configurations, the display 132 may be a touchscreen that receives input from physical touch (by a finger, stylus, or other tool, for example). Additionally or alternatively, the electronic device 102 may include or be coupled to another input interface. For example, the electronic device 102 may include a camera facing a user and may detect user gestures (e.g., hand gestures, arm gestures, eye tracking, eyelid blink, etc.). In another example, the electronic device 102 may be coupled to a mouse and may detect a mouse click. In yet another example, the electronic device 102 may be coupled to a keyboard and may receive key inputs from the keyboard. In some configurations, one or more of the images described herein may be presented on the display 132 and/or user interface 134.

The communication interface 108 may enable the electronic device 102 to communicate with one or more other electronic devices. For example, the communication interface 108 may provide an interface for wired and/or wireless communications. In some implementations, the electronic device 102 may communicate directly or indirectly (via a network, for instance) with a server device, with a client device, and/or with a vehicle. In some configurations, the communication interface 108 may be coupled to one or more antennas 110 for transmitting and/or receiving radio frequency (RF) signals. Additionally or alternatively, the communication interface 108 may enable one or more kinds of wireline (e.g., Universal Serial Bus (USB), Ethernet, etc.) communication.

In some configurations, multiple communication interfaces 108 may be implemented and/or utilized. For example, one communication interface 108 may be a cellular (e.g., 3G, Long Term Evolution (LTE), CDMA, 5G, etc.) communication interface 108, another communication interface 108 may be an Ethernet interface, another communication interface 108 may be a universal serial bus (USB) interface, and yet another communication interface 108 may be a wireless local area network (WLAN) interface (e.g., Institute of Electrical and Electronics Engineers (IEEE) 802.11 interface).

In some configurations, the electronic device 102 (e.g., image obtainer 114) may obtain one or more images (e.g., digital images, image frames, frames, video, etc.). The one or more images (e.g., frames) may be images of a scene (e.g., a vehicle interior, one or more objects, and/or background). For example, the electronic device 102 may include one or more image sensors 104 and one or more optical systems 106 (e.g., lenses). An optical system 106 may focus images of objects that are located within the field of view of the optical system 106 onto an image sensor 104. The optical system(s) 106 may be coupled to and/or controlled by the processor 112 in some configurations.

A camera may include at least one image sensor and at least one optical system. Accordingly, the electronic device 102 may be one or more cameras, may include one or more cameras, and/or may be coupled to one or more cameras in some implementations. In some configurations, the image sensor(s) 104 may capture the one or more images (e.g., image frames, video, still images, burst mode images, stereoscopic images, etc.). In some implementations, the electronic device 102 may include multiple optical system(s) 106 and/or multiple image sensors 104.

Additionally or alternatively, the electronic device 102 may request and/or receive the one or more images from another device (e.g., one or more external image sensors coupled to the electronic device 102, a network server, traffic camera, drop camera, vehicle camera, web camera, security camera, remote camera, etc.). In some configurations, the electronic device 102 may request and/or receive the one or more images via the communication interface 108. For example, the electronic device 102 may or may not include a camera (e.g., an image sensor 104 and/or optical system 106) and may receive images from one or more remote devices.

The memory 126 may store instructions and/or data. The processor 112 may access (e.g., read from and/or write to) the memory 126. Examples of instructions and/or data that may be stored by the memory 126 may include request information 138, product data 128 (e.g., auxiliary product data), service data 130 (e.g., auxiliary service data), vehicle information 136, image obtainer 114 instructions, data obtainer 116 instructions, computer vision analyzer 118 instructions, vehicle matcher 120 instructions, request obtainer 122 instructions, inventory determiner 124 instructions, and/or instructions for other elements, etc.

In some configurations, the electronic device 102 (e.g., the memory 126) may include an image data buffer (not shown). The image data buffer may buffer (e.g., store) image data (e.g., image frame(s)) from the image sensor 104. The buffered image data may be provided to the processor 112.

In some configurations, the electronic device 102 may include a camera software application and/or a display 132. When the camera application is running, images of scenes and/or objects that are located within the field of view of the optical system 106 may be captured by the image sensor(s) 104. The images that are being captured by the image sensor(s) 104 may be presented on the display 132. In some configurations, these images may be displayed in rapid succession at a relatively high frame rate so that, at any given moment in time, the objects that are located within the field of view of the optical system 106 are presented on the display 132. The one or more images obtained by the electronic device 102 may be one or more video frames and/or one or more still images.

The processor 112 may include and/or implement a data obtainer 116, a vehicle matcher 120, a request obtainer 122, an image obtainer 114, a computer vision analyzer 118, and/or an inventory determiner 124. It should be noted that one or more of the elements illustrated in the electronic device 102 and/or processor 112 may be optional. For example, the image obtainer 114 and/or the computer vision analyzer 118 may or may not be included and/or implemented. Additionally or alternatively, one or more of the elements illustrated in the processor 112 may be implemented separately from the processor 112 (e.g., in other circuitry, on another processor, on a separate electronic device, etc.).

The processor 112 may include and/or implement a request obtainer 122. The request obtainer 122 may obtain a vehicle request. For example, the request obtainer 122 may obtain information regarding a request for a shared vehicle (e.g., a vehicle for hire, a taxi, an autonomous driving service vehicle, a rental vehicle, etc.). A vehicle request may include a pickup location. The pickup location may specify a requested (e.g., prospective) pickup location of a user. A vehicle request may include a destination. The destination may specify a requested (e.g., prospective) destination of a user. For instance, the destination may indicate one or more places where a user wants to go. In some configurations, the vehicle request may include one or more time constraints. A time constraint may indicate an amount of time that a user is willing to wait (e.g., a maximum time limit) for a ride and/or a required time (e.g., time window) for pick up and/or drop off. In some configurations, the vehicle request may indicate whether the user wants a vehicle with a driver or a driverless (e.g., autonomous) vehicle. In some configurations, the vehicle request may specify one or more conventional vehicle options in addition to an auxiliary product request and/or an auxiliary service request. For example, the vehicle request may specify a vehicle type (e.g., sedan, sub-compact, sport-utility vehicle (SUV), minivan, van, truck, etc.), number of seats, cruise control, power windows, power locks, radio, compact disc (CD) player, digital video disc (DVD) player, backup camera, sunroof, leather seats, cloth seats, etc.

In some cases and/or configurations, the vehicle request may include an auxiliary product request. The auxiliary product request may indicate one or more products requested by a user. Examples of auxiliary products may include one or more of food (e.g., food items), food preparation equipment, beverages, office supplies (e.g., writing utensils, pens, pencils, paper, paperclips, staples, binders, etc.), computers (e.g., laptop computers, netbooks, tablets, etc.), removable storage (e.g., thumb drive, external hard drive, etc.), printers, copiers, reading material (e.g., newspapers, magazines, books, etc.), still cameras, video cameras, clothing, etc. Additionally or alternatively, the auxiliary product request may specify a particular quantity of one or more auxiliary products, a quality level for one or more auxiliary products, and/or one or more other aspects (e.g., price, brand, etc.). In some configurations, auxiliary products may not include one or more conventional vehicle items (e.g., some kinds of vehicle-integrated electronics, seats, climate control unit(s) (e.g., air conditioning, heating, etc.), vehicle adjustment settings (e.g., seat adjustment settings, rear-view mirror settings, steering wheel adjustments, etc.), etc.). In some implementations, the auxiliary product(s) and/or the auxiliary service(s) may increase user productivity (by allowing one or more users to accomplish more tasks while traveling, for example). In some configurations, the term "auxiliary" may mean that a product or service is not integrated into (e.g., built into) a vehicle. Additionally or alternatively, the term "auxiliary" may mean that a product or service is not a conventional product or service for a shared vehicle in some configurations.

In some cases and/or configurations, the vehicle request may include an auxiliary service request. The auxiliary service request may indicate one or more services requested by a user. Examples of auxiliary services may include one or more of food preparation, beverage preparation (e.g., drink mixing), office services (e.g., copying, printing, lamination, document preparation, etc.), massage, etc. Additionally or alternatively, the auxiliary service request may specify a particular quantity of one or more auxiliary services, a quality level for one or more auxiliary services, and/or one or more other aspects (e.g., price, provider, etc.). In some configurations, auxiliary services may not include one or more conventional vehicle services (e.g., driving service, air conditioning, heating, etc.).

In some configurations, the request obtainer 122 may obtain the vehicle request from the user interface 134. For example, the user interface 134 may receive one or more inputs (e.g., keyboard inputs, touch inputs, voice inputs, gesture inputs, etc.) that indicate the vehicle request. Additionally or alternatively, the request obtainer 122 may obtain the vehicle request from a remote device. For example, the electronic device 102 may receive the vehicle request via the communication interface(s) 108. For instance, the communication interface(s) 108 may receive a wireline and/or wireless signal indicating the vehicle request. The vehicle request may be stored as request information 138 in the memory 126.

The processor 112 may include and/or implement a data obtainer 116. The data obtainer 116 may obtain auxiliary product data and/or auxiliary service data associated with one or more vehicles. The auxiliary product data may be stored as all or part of the product data 128 in the memory 126. The auxiliary service data may be stored as all or part of the service data 130 in the memory 126. In some configurations, the data obtainer 116 may obtain other data associated with one or more vehicles. For example, the data obtainer 116 may obtain one or more vehicle locations, vehicle availability for the one or more vehicles, and/or one or more aspects (e.g., conventional aspects) of a vehicle. For example, the data obtainer 116 may request and/or receive vehicle location(s), vehicle availability, and/or vehicle aspect(s) from one or more remote devices (e.g., vehicles, electronic devices, servers, etc.). Additionally or alternatively, one or more of the vehicle location(s), vehicle availability, and/or vehicle aspect(s) may be obtained locally and/or may be predetermined. For example, the vehicle information 136 may include a set (e.g., database) of information for one or more vehicles. Additionally or alternatively, the electronic device 102 may include and/or may be in communication with a locating means (e.g., global positioning system (GPS), Wi-Fi-based locating device (e.g., triangulation), inertial navigation, etc.) for locating the electronic device 102 (e.g., vehicle).

Auxiliary product data may indicate information about one or more auxiliary products in one or more vehicles. For example, the auxiliary product data may indicate one or more auxiliary product types, one or more auxiliary product quantities, and/or one or more auxiliary product qualities. Additionally or alternatively, the auxiliary product data may indicate one or more features of one or more auxiliary products and/or one or more auxiliary product aspects (e.g., price, brand, etc.). In some configurations, the auxiliary product data may be stored in a database (e.g., auxiliary product database, auxiliary product inventory database, etc.).

Auxiliary service data may indicate information about one or more auxiliary services in one or more vehicles. For example, the auxiliary service data may indicate one or more auxiliary service types, auxiliary service availability (e.g., quantity), and/or one or more auxiliary service qualities. Additionally or alternatively, the auxiliary service data may indicate one or more features of one or more auxiliary services and/or one or more auxiliary service aspects (e.g., price, provider, etc.). In some configurations, the auxiliary service data may be stored in a database (e.g., auxiliary service database).

In some configurations, the data obtainer 116 may include an image obtainer 114 and/or a computer vision analyzer. For example, obtaining the auxiliary product data and/or the auxiliary service data may be based on image data from an interior (e.g., cabin, cargo holding space, trunk, and/or compartment) of at least one vehicle and/or based on computer vision analysis of the image data. For instance, the electronic device 102 may obtain one or more images (e.g., still images, burst images, video, etc.) from one or more vehicles and may perform computer vision analysis on the image(s) to determine auxiliary product data and/or the auxiliary service data. Additionally or alternatively, a remote device may obtain one or more images and/or may perform computer vision analysis to determine auxiliary product data and/or the auxiliary service data, which the electronic device 102 may request and/or receive. More detail regarding obtaining image(s) and/or performing computer vision analysis is given as follows, which may be performed by the electronic device 102 and/or one or more remote devices.

The processor 112 (e.g., data obtainer 116) may include and/or implement an image obtainer 114. One or more images (e.g., image frames, video, burst shots, etc.) may be provided to the image obtainer 114. For example, the image obtainer 114 may obtain image frames from one or more image sensors 104. For instance, the image obtainer 114 may receive image data from one or more image sensors 104 and/or from one or more external cameras. As described above, the image(s) may be captured from the image sensor(s) 104 included in the electronic device 102 or may be captured from one or more remote camera(s).

In some configurations, the image obtainer 114 may request and/or receive image data (e.g., one or more images, image frames, etc.). For example, the image obtainer 114 may request and/or receive one or more images from a remote device (e.g., external camera(s), remote server, remote electronic device, vehicle, etc.) via the communication interface 108. The images obtained from the cameras may be utilized by the electronic device 102 for computer vision analysis (and/or determining auxiliary product data and/or the auxiliary service data).

The processor 112 may include and/or implement a computer vision analyzer 118. The computer vision analyzer 118 may perform computer vision analysis on the image data (e.g., one or more images). In particular, the computer vision analyzer 118 may perform object recognition, object tracking, object classification, face detection, face recognition, optical character recognition, scene understanding, etc. The computer vision analysis may be utilized to determine the auxiliary product data and/or the auxiliary service data. For example, the computer vision analysis may be utilized to determine a product inventory associated with one or more vehicles.

In some configurations, a camera may have a view of a vehicle interior (e.g., of one or more stocking locations for one or more products, of a cabin, of one or more cargo holding spaces, of a trunk, and/or of one or more compartments, etc.). The camera may capture image data (e.g., one or more images of the vehicle interior). The image data may be provided to the image obtainer 114. For example, the electronic device 102 may include a camera (e.g., image sensor 104 and optical system 106) that may capture the image data and provide the image data to the image obtainer 114. In another example, a remote camera in a vehicle may capture image data and/or may send the image data to the electronic device 102 (e g, image obtainer 114). The image obtainer 114 may provide the image data to the computer vision analyzer 118.

The computer vision analyzer may perform computer vision analysis on the image data. For example, the computer vision analyzer may perform object detection, object recognition, object tracking, object classification, face detection, face recognition, and/or optical character recognition, etc., on the image data.

In some configurations, the computer vision analyzer 118 may perform object detection to produce all or part of the auxiliary product data. For example, the computer vision analyzer 118 may detect one or more objects in the image data (e.g., in one or more images, in one or more subsets of the image(s), etc.). Object detection may be based on motion and/or a detection model. For example, motion may be used to separate moving objects from a background. Additionally or alternatively, the image data (e.g., one or more images and/or one or more subsets of one or more images) may be searched for one or more objects using a detection model. For instance, one or more subsets (e.g., windows, sliding window positions, etc.) of the image data may be compared with the detection model to determine whether an object represented by the detection model is in the image data. For example, the computer vision analyzer 118 may correlate the image data with the detection model, may determine a similarity between the image data and the detection model, and/or may determine a probability of a match between the image data and the detection model, etc. Object detection may be utilized to classify one or more auxiliary products in a vehicle, determine a number of auxiliary products in the vehicle, determine whether an auxiliary product is still present in the vehicle, determine whether the auxiliary product has been taken from the vehicle, etc.

In some approaches, the computer vision analyzer 118 may recognize one or more objects (e.g., objects, characters, faces, etc.) to produce all or part of the auxiliary product data. For example, the computer vision analyzer 118 may determine recognition data (e.g., one or more keypoints, corners, edges, and/or feature vectors, etc.) from the image data. For instance, the recognition data may represent one or more aspects of one or more objects. In some approaches, the computer vision analyzer 118 may search the image data for keypoints, corners, edges, etc.

The computer vision analyzer 118 may have access to one or more recognition models corresponding to one or more objects. For example, the memory 126 may store the one or more recognition models. Examples of the recognition model(s) may include images, keypoint sets, point clouds, point models (e.g., deformable models, non-deformable models), mesh models, feature vectors, etc.

The computer vision analyzer 118 may compare the recognition data (e.g., keypoints, corners, edges, and/or feature vectors, etc.) with the recognition model(s) to determine whether the recognition data matches one or more recognition models. For example, the computer vision analyzer 118 may correlate the recognition data with the recognition model(s), may determine one or more distance measures between the recognition data and the recognition model(s), may determine a transformation between the recognition data and the recognition model(s), may determine a matching probability between the recognition data with the recognition model(s), etc. Comparing the recognition data with the recognition model(s) may produce one or more matching metrics, which may indicate a degree of similarity (and/or difference) between the recognition data and the recognition model(s). A match may be indicated by the matching metric(s). For example, a matching metric that meets a threshold (e.g., similarity threshold, probability threshold, distance threshold, recognition threshold, etc.) may indicate that the object in the image is the kind of object corresponding to the recognition model(s). Object recognition may be utilized to classify one or more objects, to determine what auxiliary product is being used, to determine what auxiliary product is being consumed, what auxiliary product has been taken from the vehicle, etc.

It should be noted that object recognition may be more specific than object detection in some configurations. For example, object detection may detect that an object is indicated in image data, while object recognition may recognize the object. In some approaches, object detection may indicate the presence of an object, while object recognition may be used to classify an object (e.g., identify an object type). In other approaches, object detection may be used to classify an object (e.g., identify an object type), while object recognition may be used to recognize one or more characteristics of the object. For example, object detection may detect an aluminum beverage can, while object recognition may determine a brand of beverage, whether the can is open, the expiration date of the beverage, etc.

Additionally or alternatively, the computer vision analyzer 118 may perform object tracking. For example, the computer vision analyzer 118 may track an object over two or more frames. In some approaches, object tracking may be performed by searching a subsequent frame for an object detected and/or tracked in a previous frame. For instance, the computer vision analyzer 118 may track keypoints, corners, edges, and/or feature vectors of an object between frames. Optical flow is one example of object tracking that may be performed. Object tracking may be utilized to determine whether an auxiliary product is being used, is being consumed, has been taken from the vehicle, etc. Object tracking may additionally or alternatively be utilized to determine an amount of time an object has been in a vehicle. For example, some items (e.g., perishable goods, food, produce, beverages, etc.) may degrade over time. Object tracking may be utilized to monitor an amount of time that an object has been in a vehicle in order to rotate and/or replace inventory as needed. For example, one or more items may expire and/or lose freshness after a period of time. If an expiration and/or freshness threshold is reached for a particular item, the item may be removed, discarded, discounted, and/or replaced, etc.

In some configurations, the computer vision analyzer 118 may perform analysis to produce computer analysis data, such as bounding boxes around individual items, segmentation of individual items, and/or one or more derived descriptions of an item's identity and/or location, etc. For example, an object's center may be derived from a bounding box or segmentation representation. The computer analysis data may be utilized to determine an inventory. For instance, item location data may be utilized to determine a number of items (e.g., whether any items have been removed and/or added). Additionally or alternatively, item identity data may be utilized to track item (e.g., product) type in an inventory. For instance, the inventory determiner 124 may compare a detected item identity data to any item types currently in the inventory. If the item type is not already in the inventory, the inventory determiner 124 may add the item type. If the item type is in the inventory, the inventory determiner 124 may add to the number of that existing item type (in the case that an item is added).

In some configurations, computer vision may be utilized for monitoring a quantity of supplies and/or ingredients as follows. One or more cameras may be mounted in a vehicle with a view of food and/or supply storage locations. Each time an auxiliary product (e.g., item, food, supply, ingredient, etc.) is removed or added, the camera(s) may be used to detect objects through object detection, object classification, or a mix of both. Other attributes of the object, such as expiration date, quantity in a bottle, etc., may also be ascertained through computer vision. For example, if the computer vision analysis indicates a passed expiration date or a partially consumed beverage, the electronic device 102 may discard the corresponding auxiliary product and/or may alert a person (e.g., driver, fleet service worker, etc.) to remove the expired or consumed item. Computer vision may provide a flexible approach for determining auxiliary product data and/or auxiliary service data. For example, computer vision may not require specialized storage containers for the auxiliary products. Computer vision may also enable flexibly adding and/or changing auxiliary products and/or auxiliary services for detection, recognition, tracking, and/or classification.

The computer vision analyzer 118 may perform object detection, object tracking, object recognition, and/or object classification to determine auxiliary service data in some configurations. For example, the computer vision analyzer 118 may detect, track, recognize, and/or classify an auxiliary service provider (e.g., a person, a worker, a robot, etc.). For instance, the computer vision analyzer 118 may perform facial recognition on a worker and/or may detect and/or recognize a uniform of an auxiliary service provider.

Additional or alternative approaches may be implemented to determine auxiliary product data and/or auxiliary service data in some configurations. For example, one or more optical and/or contact solutions may be implemented. For instance, dedicated optical (e.g., near-infrared LED) and/or mechanical (e.g., pressure) sensors may be located under and/or near each individual item. The sensors may measure presence or absence of an object. A stocker may ensure that the correct items are in each location. Dedicated optical and/or mechanical sensors may be implemented in addition to or alternatively from cameras with computer vision.

Additionally or alternatively, one or more manual scanning solutions may be implemented. For example, each auxiliary product (e.g., item) may have a barcode or other uniquely identifying symbol. Each time the auxiliary product is added or removed, the code/symbol may be scanned by a dedicated code reader. For instance, a user may manually scan (like at a grocery store checkout) the auxiliary product. Additionally or alternatively, one or more scanners may be fixed scanners so that scanning is part of the action of removing an auxiliary product.

The processor 112 (e.g., data obtainer 116) may include and/or implement an inventory determiner 124 in some configurations. The inventory determiner 124 may determine an auxiliary product inventory of one or more vehicles based on the auxiliary product data. The auxiliary product inventory may indicate one or more auxiliary product types, one or more auxiliary product quantities, and/or one or more auxiliary product qualities.

In some configurations, the inventory determiner 124 may determine the auxiliary product inventory of one or more vehicles based on the computer vision analysis. In some approaches, the computer vision analysis may indicate a quantity of one or more types of auxiliary products. For example, the computer vision analysis may indicate detected objects (e.g., auxiliary products) and/or recognized objects (e.g., auxiliary products). The inventory determiner 124 may interpret and/or organize the computer vision analysis to produce the auxiliary product inventory. For example, the inventory determiner 124 may count a number of detected auxiliary products and/or may sort the detected auxiliary products into product types. For instance, the inventory determiner 124 may total a number of auxiliary products for each auxiliary product type. Additionally or alternatively, the inventory determiner 124 may add to the quantity of an auxiliary product when the computer vision analyzer 118 detects a new instance of that auxiliary product (when stocking, for example). Or, the inventory determiner 124 may subtract from the quantity of an auxiliary product when the computer vision analyzer 118 detects that an auxiliary product has been taken and/or consumed. The auxiliary product inventory may be stored as all or part of the product data 128 in the memory 126.

In some configurations, the electronic device 102 may manage charging a user for any requested and/or consumed auxiliary product and/or auxiliary service. For example, if the electronic device 102 detects that a user has removed and/or consumed an auxiliary product and/or an auxiliary service (based on computer vision or otherwise, for example), the electronic device 102 may charge the user for the auxiliary product and/or auxiliary service. For instance, the electronic device 102 may generate and/or present a bill for the auxiliary product. Additionally or alternatively, the electronic device 102 may charge a user account (e.g., credit card, debit account, etc.) for the auxiliary product and/or auxiliary service. In some approaches, the user may be charged for obtaining a requested auxiliary product and/or a requested auxiliary service. For example, if the vehicle obtains a perishable food item for the user at the user's request, the electronic device 102 may charge the user for the perishable food item, whether or not the user consumes the perishable food item.

The auxiliary product data and/or the auxiliary service data may be dynamic. For example, one or more auxiliary product types may be changeable. More specifically, the type(s) of one or more auxiliary products in a vehicle may change. In one example, a vehicle may be requested with hamburgers as the auxiliary product for one trip. In another trip, the vehicle may be requested with tacos as the auxiliary product for the trip. In some configurations, the stock of a vehicle may not be from a predetermined menu of items.

In some configurations, the electronic device 102 may obtain and/or store vehicle information 136. The vehicle information 136 may indicate one or more aspects (e.g., conventional aspects) of a vehicle. Examples of vehicle information 136 may include vehicle type (e.g., sedan, sub-compact, sport-utility vehicle (SUV), minivan, van, truck, etc.), number of seats, cruise control, power windows, power locks, radio, compact disc (CD) player, digital video disc (DVD) player, backup camera, sunroof, leather seats, cloth seats, etc. The vehicle information 136 may indicate the aspects of one or more (e.g., a set of, a fleet of) vehicles. In some configurations, the vehicle information 136 may indicate the location of a vehicle and/or a vehicle status (e.g., available or unavailable). For example, the electronic device 102 may request and/or receive information regarding the one or more vehicles.

The processor 112 may include and/or implement a vehicle matcher 120. The vehicle matcher 120 may determine whether one or more vehicles satisfy the vehicle request. For example, the vehicle matcher 120 may determine whether one or more vehicles have an auxiliary product inventory and/or a service availability to satisfy the auxiliary product request and/or the auxiliary service request. In some cases and/or configurations, if the auxiliary product inventory of a vehicle satisfies the auxiliary product request, the vehicle matcher 120 may indicate a match and/or assign (and/or dispatch) the vehicle to satisfy the vehicle request. In some cases and/or configurations, if the auxiliary service data of a vehicle satisfies the auxiliary service request, the vehicle matcher 120 may indicate a match and/or assign (and/or dispatch) the vehicle to satisfy the vehicle request. As described in relation to FIG. 3, it should be noted that the electronic device 102 may be implemented in a client device, in a vehicle, and/or in a cloud device (e.g., one or more remote devices, servers, network devices, etc.). For example, determining whether an auxiliary product inventory would satisfy an auxiliary product request and/or determining whether auxiliary product data would satisfy an auxiliary service request may be performed by a client device, by a vehicle, and/or by a cloud device. Additionally or alternatively, indicating a match and/or assigning a vehicle to fulfill a request may be performed by a client device, by a vehicle, and/or by a cloud device.

In some configurations, the vehicle matcher 120 may utilize multiple criteria to determine whether a vehicle is a match and/or whether to assign (and/or dispatch) the vehicle to fulfill the vehicle request. For example, the vehicle matcher 120 may determine whether the aspects of one or more vehicles match the vehicle request, whether an auxiliary product request would be satisfied based on the auxiliary product data associated with the one or more vehicles, whether an auxiliary service request would be satisfied based on the auxiliary service data associated with the one or more vehicles, and/or whether the one or more vehicles can meet a time constraint (for user location pick up and/or for destination arrival, for instance). In some approaches, the vehicle matcher 120 may determine an amount of time to pick up a user at the pickup location based on the pickup location of the vehicle request and the location(s) of one or more vehicles.

If all of the criteria would be satisfied for one or more vehicles, the vehicle matcher 120 may indicate the one or more matches and/or may assign (and/or dispatch) a vehicle to fulfill the vehicle request. In some configurations, if multiple vehicles would satisfy the vehicle request, the vehicle matcher 120 may rank (e.g., prioritize) the vehicles. The vehicle matcher 120 may rank the vehicles in some approaches based on auxiliary product data (e.g., auxiliary product inventory), auxiliary product request, destination, vehicle location, pickup location, time constraint, auxiliary service data, and/or auxiliary service request. For example, the vehicle matcher 120 may calculate (based on the vehicle location, pickup location, and/or the destination, for instance) an amount of travel time for pick-up and travel. Vehicles that would take longer and/or would not meet the time constraint may be ranked lower and/or eliminated. In some approaches, the vehicle that is nearest to the pickup location and/or that can most quickly arrive at the pickup location may be ranked highest and/or assigned. In some approaches, ranking the vehicles may be based on the auxiliary product inventory. For example, the vehicle that has the most stock of the one or more requested auxiliary products may be ranked higher than other vehicles with less stock. Additionally or alternatively, ranking the vehicles may be based on the auxiliary service availability. For example, the vehicle that has the one or more requested auxiliary services may be ranked higher than other vehicles.

If not all of the criteria would be satisfied for any vehicle (within a geographical range, for example), the vehicle matcher 120 may indicate (e.g., offer, provide, etc.) one or more other options. For example, the vehicle matcher 120 may indicate one or more options. The options may mostly match the criteria of the vehicle request. For example, the vehicle matcher 120 may provide options that satisfy the auxiliary product request and/or auxiliary service request, but with a longer wait time than could satisfy the time constraint. In another example, the vehicle matcher 120 may provide options that satisfy the time constraint but that do not satisfy all of the auxiliary product request(s) and/or auxiliary service request(s). In some approaches, potential vehicles may be limited based on geographical area (e.g., within a city, county, state, distance from the pickup location, distance from the drop-off location, etc.). In some configurations, the electronic device 102 may assign a vehicle to obtain one or more auxiliary products and/or one or more auxiliary services to fulfill the vehicle request. For example, the electronic device 102 may indicate an option to send a vehicle to obtain the auxiliary product(s) and/or the auxiliary service(s). The option may be presented contingent on an additional fee in some configurations. For example, a vehicle may be assigned and/or dispatched to obtain one or more requested auxiliary products and/or one or more requested auxiliary services if a user assents to paying a fee for the additional travel of the vehicle.

Assigning a vehicle may include indicating the assignment to a vehicle, a driver, and/or a remote device (e.g., a computer of a fleet manager). For example, the electronic device 102 may present an assignment on the display 132 (e.g., user interface 134), may send the assignment to a device (e.g., smartphone) of a driver, and/or may send the assignment to a remote device. In some configurations, assigning the vehicle may also include initiating a payment procedure. For example, the electronic device 102 may present a message (on the display 132) and/or send a message to a remote device (e.g., a user's smartphone) requesting acceptance of an agreement (e.g., contract, terms and conditions, etc.) to pay in exchange for the vehicle transportation. Additionally or alternatively, the electronic device 102 may request payment for the vehicle transportation (upon assignment and/or upon completion of the ride).

Dispatching a vehicle may include commanding and/or instructing a vehicle and/or a driver (via a remote device such as a smartphone) to fulfill the vehicle request. For example, the electronic device 102 may send one or more commands and/or instructions to an autonomous vehicle and/or to a vehicle driver (via a remote device) to fulfill the vehicle request. Commands and/or instructions may include driving directions, departure time, pickup time, pickup location, destination, one or more time constraints, etc.

It should be noted that one or more of the elements or components of the electronic device 102 may be combined and/or divided. For example, one or more of the request obtainer 122, the data obtainer 116, the vehicle matcher 120, the image obtainer 114, the computer vision analyzer 118, and/or the inventory determiner 124 may be combined. Additionally or alternatively, one or more of the request obtainer 122, the data obtainer 116, the vehicle matcher 120, the image obtainer 114, the computer vision analyzer 118, and/or the inventory determiner 124 may be divided into elements or components that perform a subset of the operations thereof.

Figure 2:
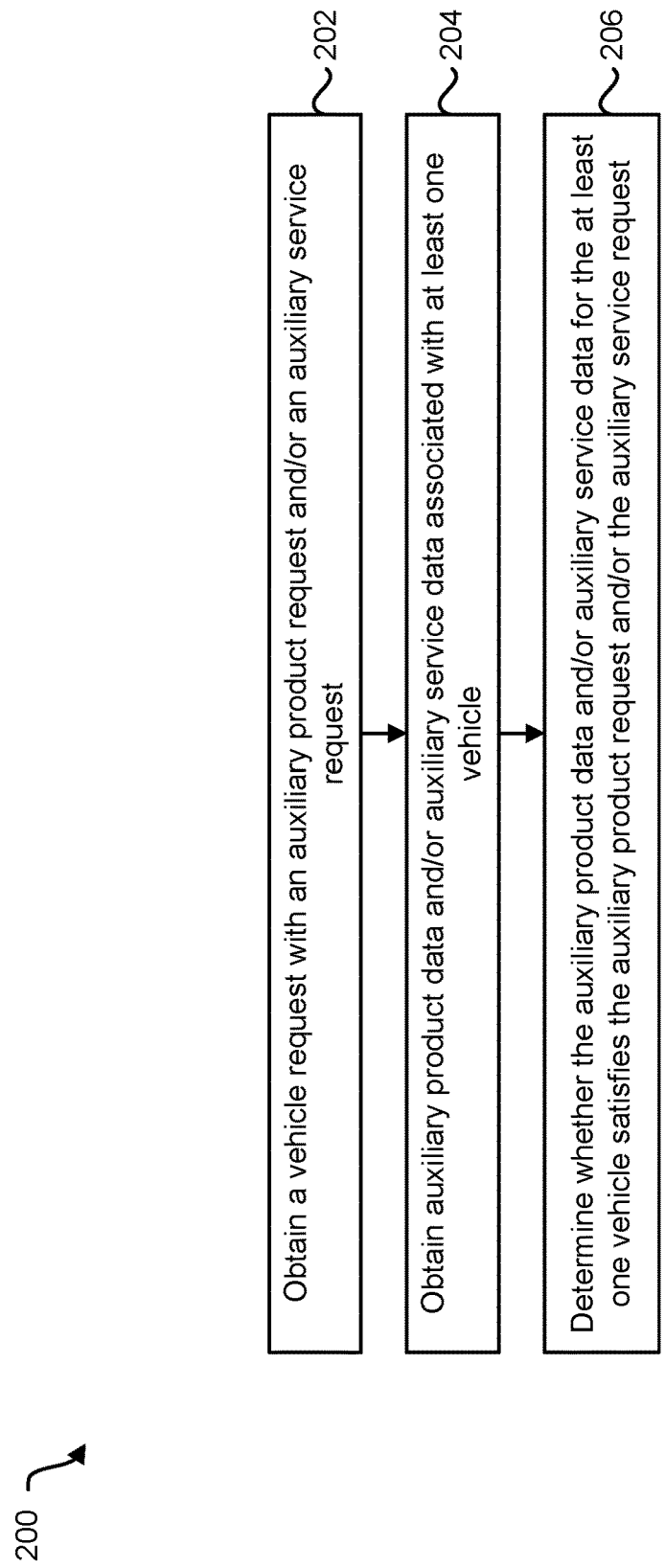
FIG. 2 is a flow diagram illustrating one configuration of a method for customizing amenities in shared vehicles.

FIG. 2 is a flow diagram illustrating one configuration of a method 200 for customizing amenities in shared vehicles. The method 200 may be performed by the electronic device 102, for example. In some configurations, the method 200 may be utilized to match (e.g., pair) a vehicle with a vehicle request (e.g., user).

The electronic device 102 may obtain 202 a vehicle request with an auxiliary product request and/or an auxiliary service request. This may be accomplished as described above in connection with FIG. 1. For example, the electronic device 102 may obtain an auxiliary product request and/or an auxiliary service request from a user interface and/or from a remote device.

The electronic device 102 may obtain 204 auxiliary product data and/or auxiliary service data associated with at least one vehicle. This may be accomplished as described above in connection with FIG. 1. For example, the electronic device 102 may perform computer vision analysis on one or more images to determine auxiliary product data (e.g., quantity and/or type of one or more auxiliary products in one or more vehicles) and/or auxiliary service data and/or may receive the auxiliary product data and/or auxiliary service data from one or more remote devices (e.g., electronic devices, vehicles, scanners, smartphones, etc.). Additionally or alternatively, the electronic device 102 may utilize dedicated optical and/or mechanical sensors to detect auxiliary product data (e.g., quantity and/or type of one or more auxiliary products in one or more vehicles). Additionally or alternatively, the electronic device 102 may utilize one or more scanners (e.g., manual scanners, fixed scanners, etc.) to obtain the auxiliary product data.

The electronic device 102 may determine 206 whether the auxiliary product data and/or auxiliary service data for the at least one vehicle satisfies the auxiliary product request and/or the auxiliary service request. This may be accomplished as described in connection with FIG. 1. For example, the electronic device 102 may determine whether one or more types and/or one or more quantities of auxiliary products (e.g., auxiliary product inventory) in one or more vehicles meets or exceeds the type(s) and/or quantity(ies) of the auxiliary product request. Additionally or alternatively, the electronic device 102 may determine whether one or more types of auxiliary services in one or more vehicles are available to satisfy the auxiliary service request. In some configurations, one or more additional or alternative criteria (e.g., time constraint, distance, conventional vehicle options, etc.) may be taken into account when attempting to match a vehicle to a vehicle request and/or to rank vehicles.

In some configurations, the electronic device 102 may assign and/or dispatch a vehicle based on the determination 206. For example, the electronic device 102 may assign and/or dispatch a vehicle with one or more auxiliary products and/or auxiliary services that satisfy the auxiliary product request and/or the auxiliary service request.

Figure 3:
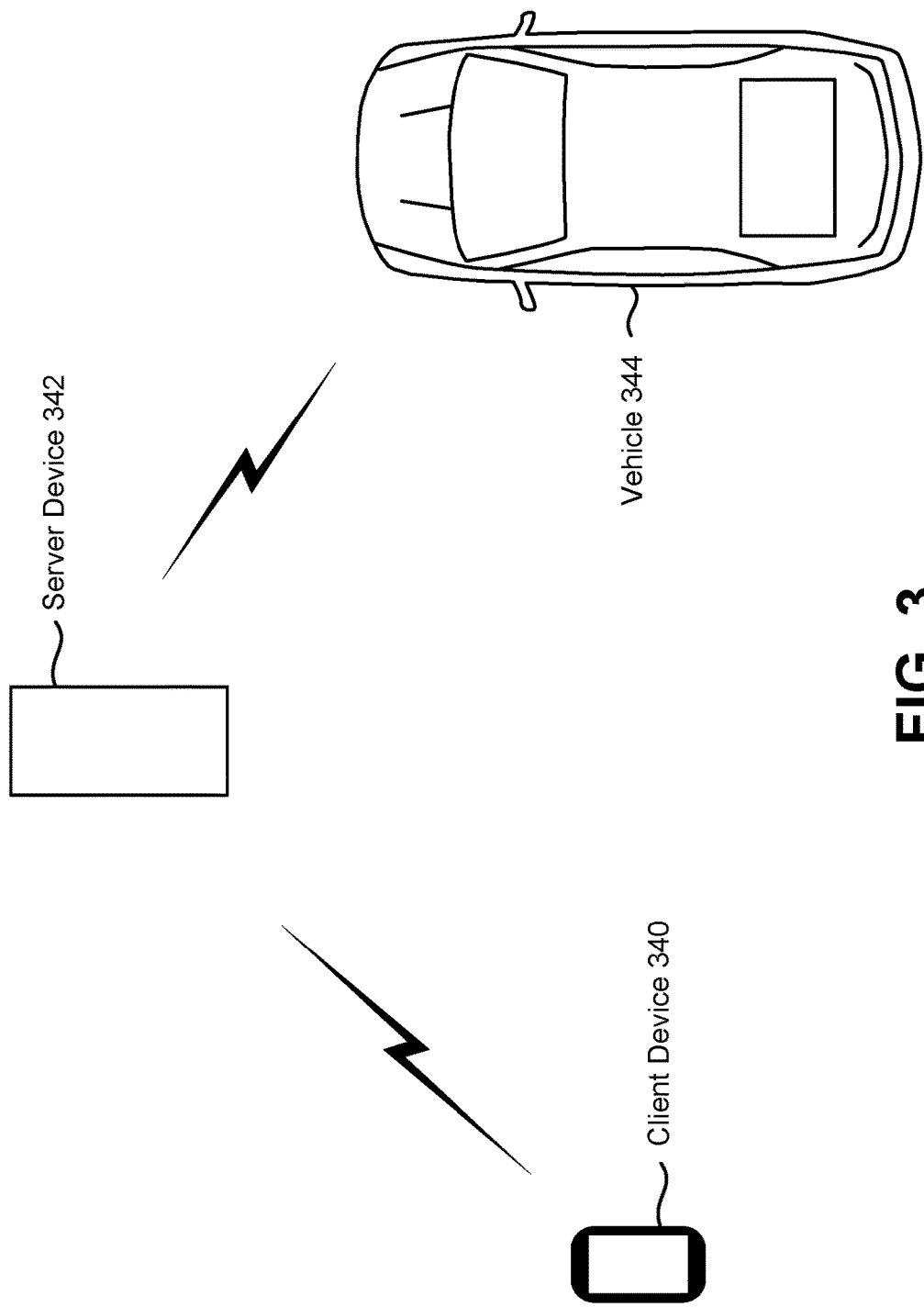
FIG. 3 is a diagram illustrating an example of a client device, a server device, and a vehicle.

FIG. 3 is a diagram illustrating an example of a client device 340, a server device 342, and a vehicle 344. Some configurations of the systems and methods disclosed herein may be implemented in the client device 340, the server device 342, and/or the vehicle. For example, the electronic device 102 described in connection with FIG. 1 may be implemented in the client device 340, the server device 342, or the vehicle 344. Additionally or alternatively, one or more of the functions, operations, procedures, blocks, components, elements, etc., described in connection with one or more of FIGS. 1 and 2 may be distributed between the client device 340, the server device 342, and/or the vehicle 344. The client device 340, the server device 342, and/or the vehicle 344 may communicate directly (with one or more wired and/or wireless links) and/or may communicate via a network (e.g., wired and/or wirelessly with one or more intervening network devices (e.g., routers, switches, hubs, servers, gateways, access points, etc.).

In one example, the electronic device 102 described in connection with FIG. 1 may be implemented as the client device 340 described in connection with FIG. 3. For instance, the client device 340 may send a vehicle request to the server device 342. The server device 342 may obtain one or more images, auxiliary product data, and/or auxiliary service data associated with the vehicle 344, which the server device 342 may provide to the client device 340. In an approach where one or more images are provided, the client device 340 may perform computer vision analysis on the image data to determine the auxiliary product data and/or the auxiliary service data, and/or whether the vehicle 344 would satisfy the vehicle request (e.g., auxiliary product request, auxiliary service request, etc.). In an approach where the auxiliary product data and/or the auxiliary service data are provided, the client device 340 may determine whether the auxiliary product data and/or the auxiliary service data would satisfy the vehicle request. The client device 340 may assign and/or dispatch the vehicle 344 (via the server device 342, for example) if the auxiliary product data and/or the auxiliary service data would satisfy the vehicle request.

In another example, the electronic device 102 described in connection with FIG. 1 may be implemented as the server device 342 described in connection with FIG. 3. For instance, the server device 342 may receive a vehicle request from the client device 340. The server device 342 may obtain one or more images, auxiliary product data, and/or auxiliary service data associated with the vehicle 344. In some approaches, the server device 342 may provide (e.g., send, transmit, etc.) the image(s), auxiliary product data, and/or auxiliary service data to the client device 340. In another approach, the server device 342 may perform computer vision analysis on the image data to determine the auxiliary product data and/or the auxiliary service data, and/or whether the vehicle 344 would satisfy the vehicle request (e.g., auxiliary product request, auxiliary service request, etc.). In an approach where the auxiliary product data and/or the auxiliary service data are obtained directly from the vehicle 344, the server device 342 and/or the client device 340 may determine whether the auxiliary product data and/or the auxiliary service data would satisfy the vehicle request. The server device 342 or the client device 340 may assign and/or dispatch the vehicle 344 if the auxiliary product data and/or the auxiliary service data would satisfy the vehicle request.

In yet another example, the electronic device 102 described in connection with FIG. 1 may be implemented as the vehicle 344 described in connection with FIG. 3. For instance, the vehicle 344 may receive a vehicle request from the client device 340 and/or the server device 342. The vehicle 344 may obtain one or more images, auxiliary product data, and/or auxiliary service data associated with the vehicle 344. In some approaches, the vehicle 344 may provide (e.g., send, transmit, etc.) the image(s), auxiliary product data, and/or auxiliary service data to the server device 342 and/or client device 340 (via the server device 342, for instance). In another approach, the vehicle 344 may perform computer vision analysis on the image data to determine the auxiliary product data and/or the auxiliary service data, and/or whether the vehicle 344 would satisfy the vehicle request (e.g., auxiliary product request, auxiliary service request, etc.). In an approach where the auxiliary product data and/or the auxiliary service data are determined by the vehicle 344, the vehicle 344, the server device 342, and/or the client device 340 may determine whether the auxiliary product data and/or the auxiliary service data would satisfy the vehicle request. The vehicle, 344, the server device 342, or the client device 340 may assign and/or dispatch the vehicle 344 if the auxiliary product data and/or the auxiliary service data would satisfy the vehicle request.

Figure 4:
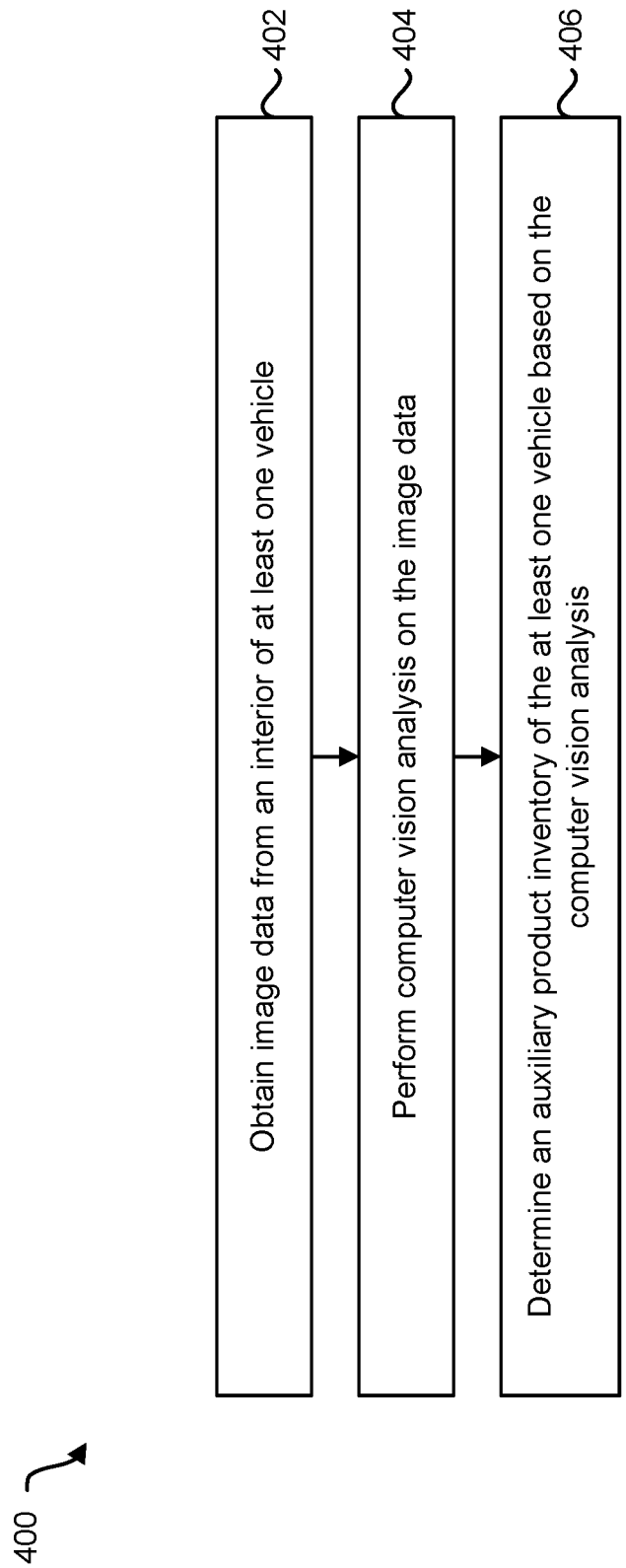
FIG. 4 is a flow diagram illustrating one configuration of a method for determining a product inventory based on computer vision analysis.

FIG. 4 is a flow diagram illustrating one configuration of a method 400 for determining a product inventory based on computer vision analysis. The method 400 may be performed by the electronic device 102, for example.

The electronic device 102 may obtain 402 image data from an interior of at least one vehicle. This may be accomplished as described above in connection with FIG. 1. For example, the electronic device 102 may capture the image data with one or more cameras or may receive the image data from a remote device (e.g., a vehicle).

The electronic device 102 may perform 404 computer vision analysis on the image data. This may be accomplished as described above in connection with FIG. 1. For example, the electronic device 102 may perform object detection, object recognition, object tracking, and/or object classification on the image data.

The electronic device 102 may determine 406 an auxiliary product inventory of the at least one vehicle based on the computer vision analysis. This may be accomplished as described in connection with FIG. 1. For example, the electronic device 102 may determine auxiliary product data based on the computer vision analysis. In some configurations, the auxiliary product inventory may indicate a quantity of one or more food items.

In some approaches, the electronic device 102 may determine a number of auxiliary products based on object detection and may determine one or more types of auxiliary products based on object recognition. The electronic device 102 may count a number of detected auxiliary products and/or may sort the detected auxiliary products according to product type. The auxiliary product inventory may indicate a quantity (e.g., number) of one or more types of auxiliary products. In some configurations, the auxiliary product inventory may be stored in memory (e.g., the memory 126 as part of the product data 128) and/or may be sent to a remote device. For example, the auxiliary product inventory may be stored in a database (e.g., a supply and/or ingredient inventory database). Additionally or alternatively, the auxiliary product inventory may be presented on a display (e.g., display 132 and/or user interface 134).

In some configurations, the electronic device 102 may assign and/or dispatch a vehicle based on the auxiliary product inventory. For example, the electronic device 102 may assign and/or dispatch a vehicle with one or more auxiliary products that satisfy the auxiliary product request and/or the auxiliary service request.

Figure 5:
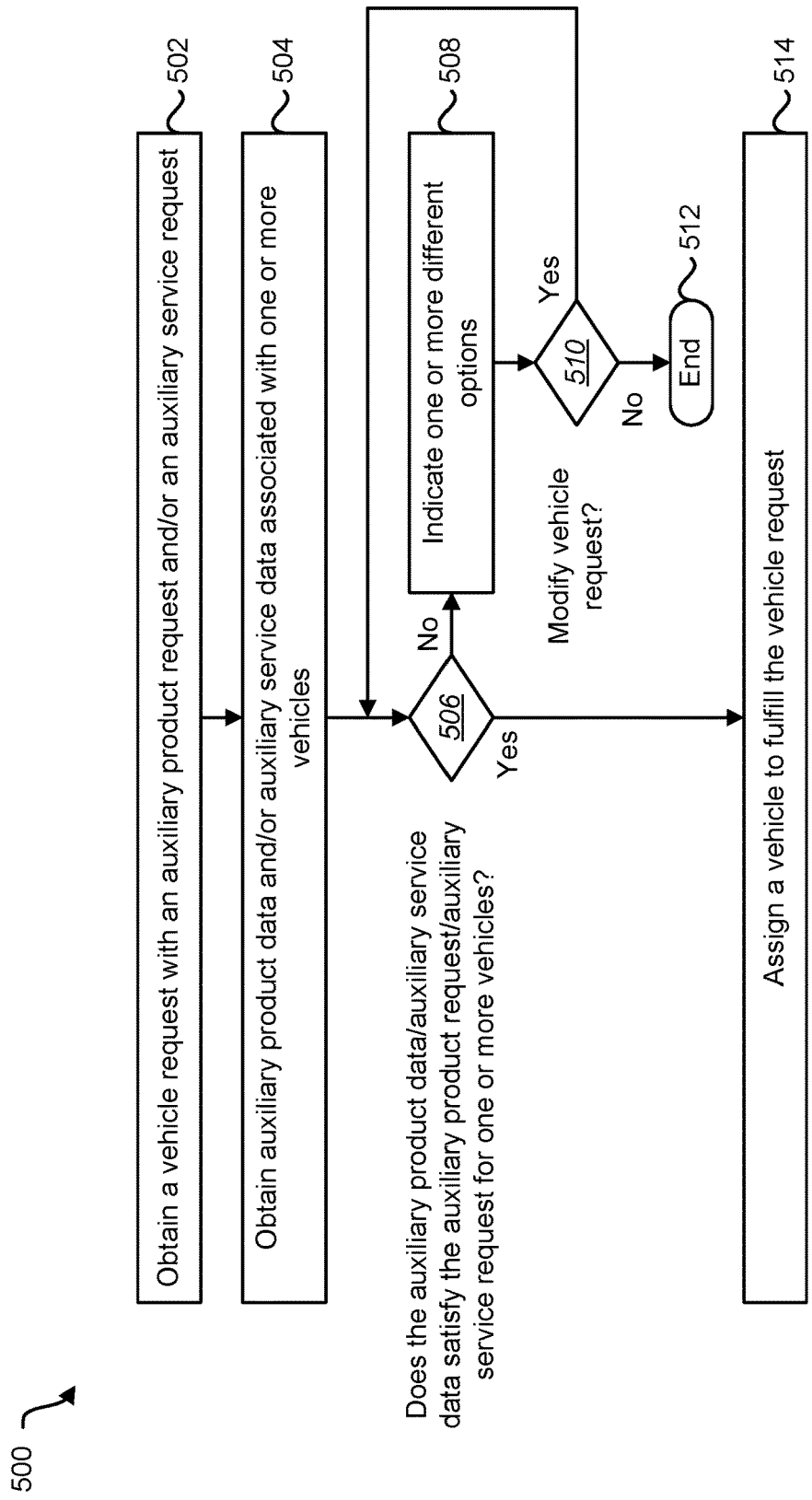
FIG. 5 is a flow diagram illustrating a more specific configuration of a method for customizing amenities in shared vehicles.

FIG. 5 is a flow diagram illustrating a more specific configuration of a method 500 for customizing amenities in shared vehicles. The method 500 may be performed by the electronic device 102, for example.

The electronic device 102 may obtain 502 a vehicle request with an auxiliary product request and/or an auxiliary service request. This may be accomplished as described above in connection with one or more of FIGS. 1-3.

The electronic device 102 may obtain 504 auxiliary product data and/or auxiliary service data associated with one or more vehicles. This may be accomplished as described above in connection with one or more of FIGS. 1-4.

The electronic device 102 may determine 506 whether the auxiliary product data and/or auxiliary service data for the at least one vehicle satisfies the auxiliary product request and/or the auxiliary service request. This may be accomplished as described in connection with one or more of FIGS. 1-4. For example, the electronic device 102 may determine whether one or more types and/or one or more quantities of auxiliary products (e.g., auxiliary product inventory) in one or more vehicles meets or exceeds the type(s) and/or quantity(ies) of the auxiliary product request. Additionally or alternatively, the electronic device 102 may determine whether one or more types of auxiliary services in one or more vehicles are available to satisfy the auxiliary service request. In some configurations, one or more additional or alternative criteria (e.g., time constraint(s), distance, conventional vehicle options, etc.) may be taken into account.

If the auxiliary product data and/or auxiliary service data satisfies the auxiliary product request and/or auxiliary service request for one or more vehicles, the electronic device 102 may assign 514 (and/or dispatch) a vehicle to fulfill the vehicle request. For example, the electronic device 102 may assign and/or dispatch a vehicle with one or more auxiliary products and/or auxiliary services that satisfy the auxiliary product request and/or the auxiliary service request.

If the auxiliary product data and/or auxiliary service data does not satisfy the auxiliary product request and/or auxiliary service request for one or more vehicles, the electronic device 102 may indicate 508 (e.g., provide) one or more different options. This may be accomplished as described in connection with FIG. 1. For example, the electronic device 102 may indicate one or more options that partially satisfy (e.g., match) the criteria. For instance, the one or more options may include one or more vehicles with longer wait times (than the time constraint, for example) and/or that fully or partially satisfy the auxiliary product request and/or auxiliary service request, etc. In some approaches, the options may be ranked (e.g., prioritized) based on the degree to which the criteria would be satisfied. The options may be presented on a display (e.g., user interface) and/or may be sent for presentation to a user (e.g., sent to a user's smartphone).

The electronic device 102 may determine 510 whether to modify the vehicle request. For example, the electronic device 102 may determine whether to modify the auxiliary product request and/or the auxiliary service request. Additionally or alternatively, the electronic device 102 may determine whether to modify one or more time constraints and/or other criteria of the vehicle request.

In some approaches, the electronic device 102 may receive a selection (based on an input received from a user, for example) of the one or more indicated options. If a selection is received, the electronic device 102 may modify the vehicle request in accordance with the selected option. In some approaches, the electronic device 102 may return to determine 506 whether the modified vehicle request satisfies the auxiliary product request and/or auxiliary service request for one or more vehicles. In other approaches, the electronic device 102 may directly assign 514 the vehicle corresponding to the selected option. If it is determined 510 not to modify the vehicle request, operation may end 512.

In an additional or alternative approach, if there is no vehicle available that would satisfy the vehicle request, the electronic device 102 may assign (and/or dispatch) a vehicle to obtain the requested auxiliary product(s) and/or auxiliary service(s). For example, the electronic device 102 may assign a vehicle to go and obtain fast food in accordance with an auxiliary product request (if obtaining the auxiliary product request can be completed within one or more time constraints and/or geographical constraints, for example). In some configurations, the user may be charged an additional fee for obtaining the requested auxiliary product(s) and/or auxiliary service(s) (if the user accepts the additional charge in advance, for example).

Figure 6:
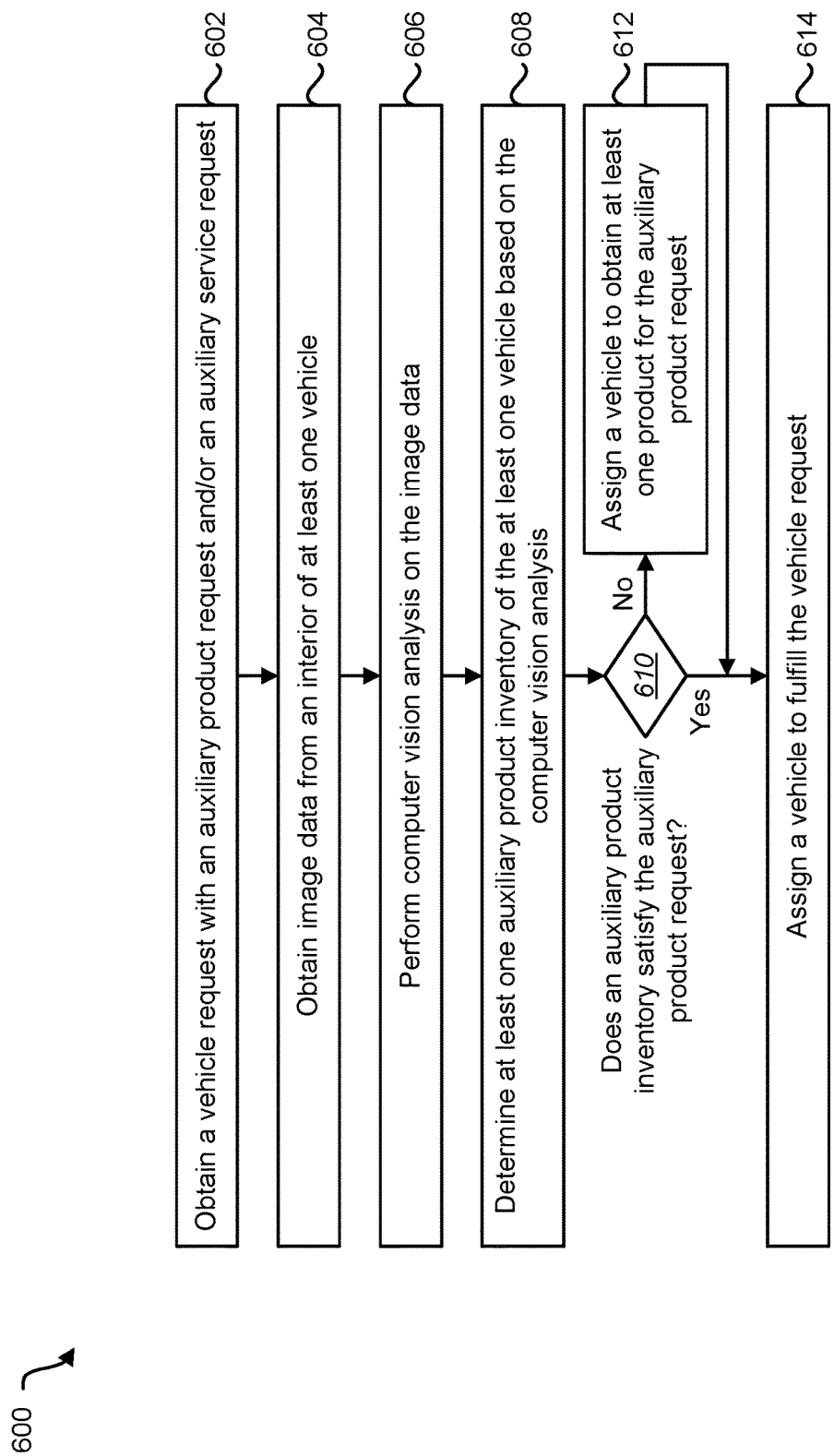
FIG. 6 is a flow diagram illustrating another more specific configuration of a method for customizing amenities in shared vehicles.

FIG. 6 is a flow diagram illustrating another more specific configuration of a method 600 for customizing amenities in shared vehicles. The method 600 may be performed by the electronic device 102, for example.

The electronic device 102 may obtain 602 a vehicle request with an auxiliary product request and/or an auxiliary service request. This may be accomplished as described above in connection with one or more of FIGS. 1-4.

The electronic device 102 may obtain 604 image data from an interior of at least one vehicle. This may be accomplished as described above in connection with one or more of FIGS. 1-4.

The electronic device 102 may perform 606 computer vision analysis on the image data. This may be accomplished as described in connection with one or more of FIGS. 1-4.

The electronic device 102 may determine 608 at least one auxiliary product inventory of the at least one vehicle based on the computer vision analysis. This may be accomplished as described in connection with one or more of FIGS. 1 and 4. For example, the electronic device 102 may produce the auxiliary product inventory according to auxiliary product data as indicated by the computer vision analysis. In some cases and/or configurations, an auxiliary product inventory may be determined 608 for each vehicle.

The electronic device 102 may determine 610 whether an auxiliary product inventory (associated with each vehicle, for example) satisfies the auxiliary product request. This may be accomplished as described in connection with one or more of FIGS. 1-5. For example, the electronic device 102 may determine whether one or more types and/or one or more quantities of auxiliary products (e.g., auxiliary product inventory) in one or more vehicles meets or exceeds the type(s) and/or quantity(ies) of the auxiliary product request. In some configurations, one or more additional or alternative criteria (e.g., time constraint(s), distance, conventional vehicle options, etc.) may be taken into account.

If an auxiliary product inventory satisfies the auxiliary product request (for one or more vehicles, for example), the electronic device 102 may assign 614 (and/or dispatch) a vehicle to fulfill the vehicle request. This may be accomplished as described in connection with one or more of FIGS. 1-5. For example, the electronic device 102 may assign and/or dispatch a vehicle with one or more auxiliary products that satisfy the auxiliary product request.

If an auxiliary product inventory does not satisfy the auxiliary product request for one or more vehicles, the electronic device 102 may assign 612 a vehicle to obtain at least one product for the auxiliary product request. This may be accomplished as described in connection with one or more of FIGS. 1 and 5. In another approach, the electronic device 102 may present one or more different options.

Figure 7:
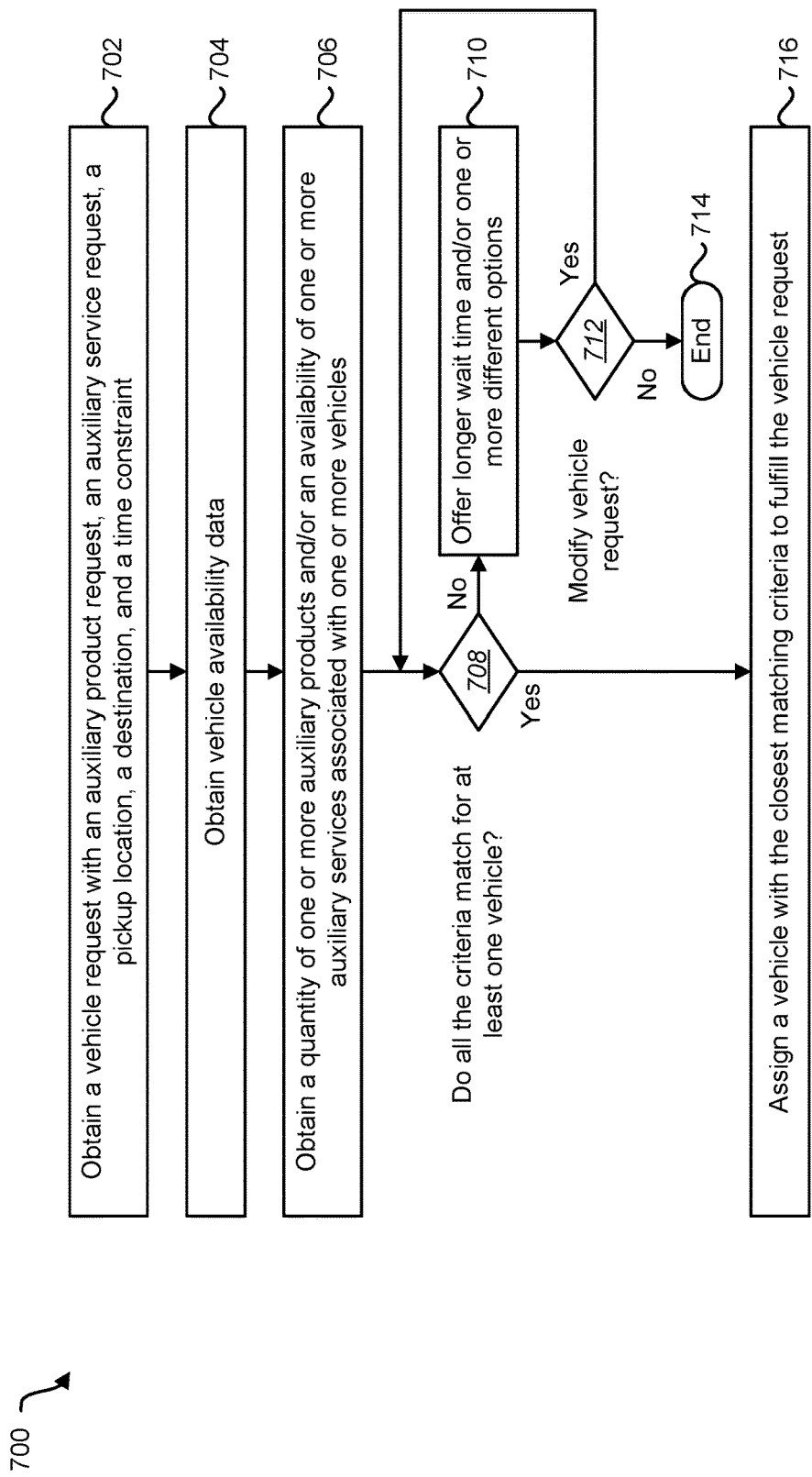
FIG. 7 is a flow diagram illustrating yet another more specific configuration of a method for customizing amenities in shared vehicles.

FIG. 7 is a flow diagram illustrating yet another more specific configuration of a method 700 for customizing amenities in shared vehicles. The method 700 may be performed by the electronic device 102, for example.

The electronic device 102 may obtain 702 a vehicle request with an auxiliary product request, an auxiliary service request, a pickup location, a destination, and/or a time constraint. This may be accomplished as described above in connection with one or more of FIGS. 1-3 and 5-6. The auxiliary product request may indicate a request for one or more auxiliary products. The auxiliary service request may indicate a request for one or more auxiliary services.

The electronic device 102 may obtain 704 vehicle availability data. This may be accomplished as described above in connection with FIG. 1. For example, the electronic device 102 may request and/or receive vehicle availability data that indicates whether one or more vehicles are available or unavailable. A vehicle may be unavailable for one or more reasons. For example, the vehicle may be off-duty, may be currently serving another user, and/or may be indicated as unavailable by a driver.

The electronic device 102 may obtain 706 a quantity of one or more auxiliary products and/or an availability of one or more auxiliary services associated with one or more vehicles (e.g., of one or more available vehicles). This may be accomplished as described above in connection with one or more of FIGS. 1-6. For example, the auxiliary product data, auxiliary service data, computer vision analysis, auxiliary product inventory, etc., may indicate the quantity of the auxiliary product(s) and/or the availability of the auxiliary service(s).

The electronic device 102 may determine 708 whether all of the criteria (e.g., the auxiliary product data, auxiliary service data, time constraint for the pickup location and/or the destination, etc.) matches for at least one vehicle (e.g., at least one available vehicle). This may be accomplished as described in connection with one or more of FIGS. 1-6. For example, the electronic device 102 may determine whether there is a sufficient quantity of auxiliary product(s) (in the vehicle and/or that may be obtained, for instance) to satisfy the auxiliary product request and/or whether the one or more auxiliary services are available (in the vehicle and/or may be obtained) to satisfy the auxiliary service request. The electronic device 102 may also determine whether the ride may be completed within the time constraint based on the location of each vehicle, the pickup location, and/or the destination. For instance, the electronic device 102 may calculate (based on one or more driving distances, traffic, weather, etc., for example) an amount of time required to complete (with a threshold probability, for example) the ride and/or obtain any product(s) or service(s) needed to fulfill the request(s). If the amount of calculated time is less than the time constraint and if there is a sufficient quantity of auxiliary product(s) and/or available service(s) (or may be obtained within the time constraint), then the criteria may match for that vehicle.

If all of the criteria match for at least one vehicle, the electronic device 102 may assign 716 (and/or dispatch) a vehicle with the closest matching criteria to fulfill the vehicle request. This may be accomplished as described in connection with one or more of FIGS. 1-6. For example, the electronic device 102 may assign and/or dispatch a vehicle with one or more auxiliary products and/or auxiliary services that may satisfy the auxiliary product request and/or the auxiliary service request within the time constraint(s).

If not all of the criteria match for at least one vehicle (e.g., for any vehicle within a geographical area, for example), the electronic device 102 may offer 710 (e.g., provide) a longer wait time and/or one or more different options. This may be accomplished as described in connection with one or more of FIGS. 1 and 5-6. For instance, the one or more options may include one or more vehicles with longer wait times (than the time constraint, for example) and/or that fully or partially satisfy the auxiliary product request and/or auxiliary service request, etc. In some approaches, the one or more options may include one or more vehicles that are currently unavailable but are anticipated to become available at a later time.

The electronic device 102 may determine 712 whether to modify the vehicle request. For example, the electronic device 102 may determine whether to modify the auxiliary product request, the auxiliary service request, the time constraint(s), and/or one or more other criteria of the vehicle request. For instance, the electronic device 102 may receive a selection (based on an input received from a user, for example) of the one or more indicated options. If a selection is received, the electronic device 102 may modify the vehicle request in accordance with the selected option. In some approaches, the electronic device 102 may return to determine 708 whether all the criteria (of the modified vehicle request) match for one or more vehicles. In other approaches, the electronic device 102 may directly assign 716 the vehicle corresponding to the selected option. If it is determined 712 not to modify the vehicle request, operation may end 714. In an additional or alternative approach, if there is no vehicle available that would satisfy the vehicle request, the electronic device 102 may assign (and/or dispatch) a vehicle to obtain the requested auxiliary product(s) and/or auxiliary service(s).

Figure 8:
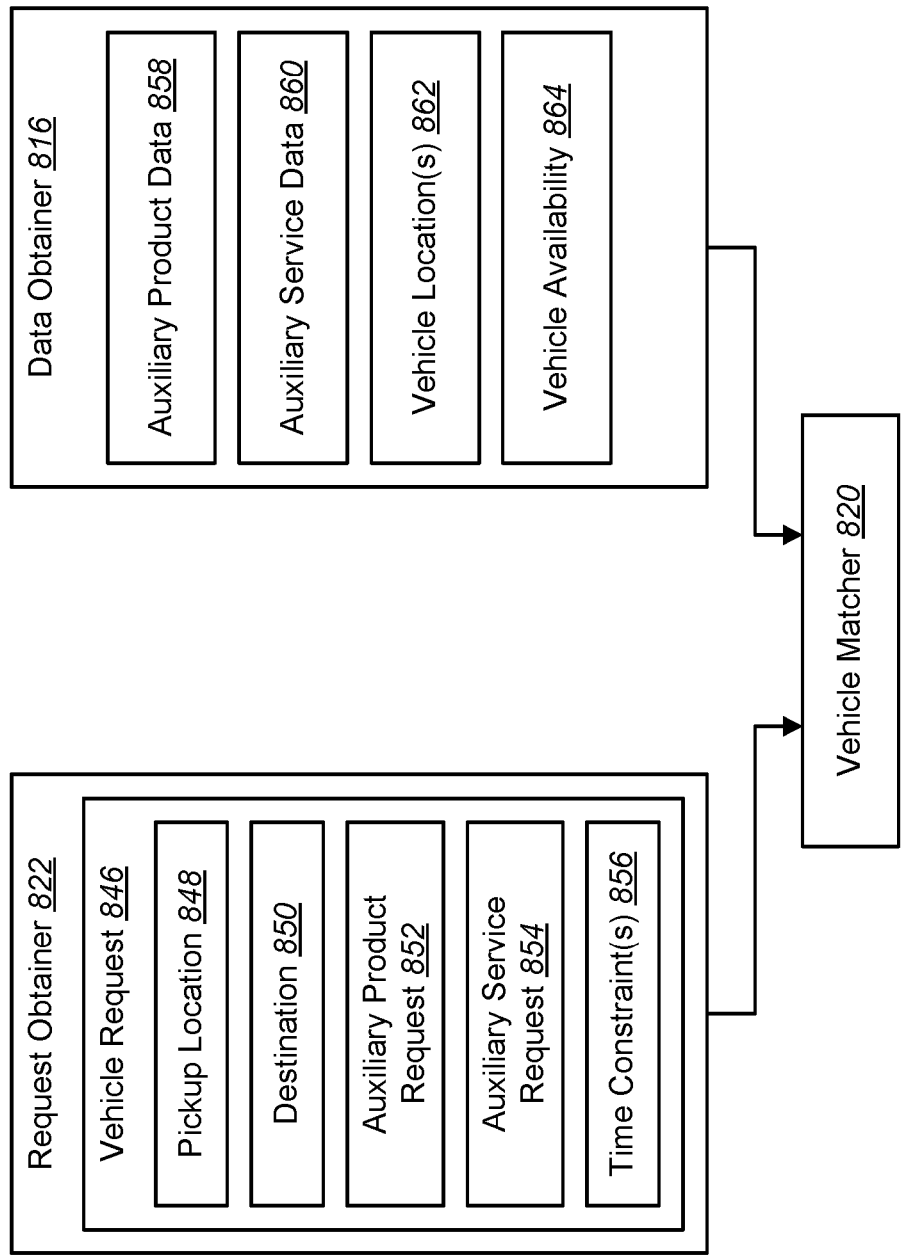
FIG. 8 is a block diagram illustrating examples of a request obtainer, a data obtainer, and a vehicle matcher.

FIG. 8 is a block diagram illustrating examples of a request obtainer 822, a data obtainer 816, and a vehicle matcher 820. The request obtainer 822, data obtainer 816, and/or vehicle matcher 820 may be examples of corresponding components described in connection with FIG. 1 and/or may be implemented in the electronic device 102 (e.g., processor 112) described in connection with FIG. 1 in some configurations.

The request obtainer 822 may obtain a vehicle request 846. For example, the request obtainer 822 may obtain the vehicle request 846 from a user interface and/or may receive the vehicle request 846 from a remote device. The vehicle request 846 may include a pickup location 848, a destination 850, an auxiliary product request 852, an auxiliary service request 854, and/or one or more time constraints 856. The pickup location 848 may be obtained from a locating device (e.g., GPS, Wi-Fi-based locating device, inertial navigation device, etc.) or may be obtained from an input (e.g., a manual user input). The destination 850 may be obtained from a locating device (e.g., GPS, Wi-Fi-based locating device, inertial navigation device, etc.) or may be obtained from an input (e.g., a manual user input). The pickup location 848 and/or destination 850 may be obtained locally (e.g., by the electronic device 102) and/or from a remote device (via the communication interface 108, for example).

In some configurations, the vehicle request may indicate whether the user wants a vehicle with a driver or a driverless (e.g., autonomous) vehicle. In some configurations, the vehicle request 846 may specify one or more conventional vehicle items or options (e.g., some kinds of vehicle-integrated electronics, seats, climate control unit(s) (e.g., air conditioning, heating, etc.), vehicle adjustment settings (e.g., seat adjustment settings, rear-view mirror settings, steering wheel adjustments, etc.), etc.)) in addition to the auxiliary product request 852 and/or the auxiliary service request 854.

The auxiliary product request 852 may indicate one or more auxiliary products requested by a user. The auxiliary service request 854 may indicate one or more services requested by a user.

In some configurations, the request obtainer 822 may obtain the vehicle request from a user interface. For example, the user interface may receive one or more inputs (e.g., keyboard inputs, touch inputs, voice inputs, gesture inputs, etc.) that indicate the vehicle request 846. Additionally or alternatively, the request obtainer 822 may obtain the vehicle request 846 from a remote device. For example, the request obtainer 822 may receive the vehicle request 846 via one or more communication interface(s). The vehicle request 846 may be stored in memory in some configurations.

The data obtainer 816 may obtain auxiliary product data 858, auxiliary service data 860, one or more vehicle locations 862, and/or vehicle availability 864 information associated with one or more vehicles. For example, the data obtainer 816 may determine an auxiliary product inventory and/or an auxiliary service availability. The auxiliary product data 858 may be stored in memory. The auxiliary service data 860 may be stored in memory. In some configurations, obtaining the auxiliary product data and/or the auxiliary service data may be based on image data from an interior of at least one vehicle and/or based on computer vision analysis of the image data as described herein. Additionally or alternatively, dedicated optical sensing, dedicated mechanical sensing, and/or scanning may be utilized to obtain the auxiliary product data 858 and/or auxiliary service data 860.

The data obtainer 816 may request and/or receive the vehicle location(s) 862 and/or vehicle availability 864 (and/or one or more vehicle aspects, for instance) from one or more remote devices (e.g., vehicles, electronic devices, servers, etc.). Additionally or alternatively, one or more of the vehicle location(s), vehicle availability, and/or vehicle aspect(s) may be obtained locally and/or may be predetermined. In some configurations, each vehicle location may be determined and/or reported by each vehicle and/or electronics in each vehicle. For example, a vehicle may include a location device (e.g., GPS, Wi-Fi-based locating device, inertial navigation device, etc.) that may be utilized to determine the vehicle location 862.

In some configurations, the vehicle availability 864 may be determined based on whether the vehicle is currently carrying out an assigned trip. For example, if a vehicle has been assigned to carry out (and is currently carrying out, for instance) an assignment, the vehicle and/or electronics in the vehicle may indicate that the vehicle is unavailable. Otherwise, the vehicle and/or electronics in the vehicle may indicate that the vehicle is available. Additionally or alternatively, the vehicle availability 864 may be determined based on an input (e.g., a user input). For example, a device may receive an input (from a driver, for example) indicating whether the vehicle is available or unavailable. In some configurations, the vehicle availability 864 may be determined based on the location of the vehicle (e.g., vehicle location 862).

The vehicle matcher 820 may obtain the vehicle request 846 (e.g., one or more vehicle requests) and may obtain auxiliary product data 858, auxiliary service data 860, one or more vehicle locations 862 and/or vehicle availability 864 information from the data obtainer 816. The vehicle matcher 820 may determine whether one or more vehicles associated with the auxiliary product data 858, the auxiliary service data 860, the vehicle location(s) 862, and/or the vehicle availability 864 may satisfy the vehicle request 846 (e.g., pickup location 848, destination 850, auxiliary product request 852, auxiliary service request 854, and/or one or more time constraints 856). For example, the vehicle matcher 820 may determine whether one or more vehicles have auxiliary product(s) (e.g., inventory) available, auxiliary service(s) available, vehicle location, and/or vehicle availability to satisfy the vehicle request 846 (auxiliary product request 852 and/or the auxiliary service request 854). In some configurations, the vehicle matcher 820 may perform a query on one or more databases (e.g., an auxiliary products database, an auxiliary service database, a supply and/or ingredient inventory database, etc.) based on the auxiliary product request 852 and/or the auxiliary service request 854. For example, the vehicle matcher 820 may query the database(s) for one or more auxiliary products and/or one or more auxiliary services identified by the auxiliary product request 852 and/or the auxiliary service request 854. The auxiliary product data 858 may indicate a quantity of one or more auxiliary products available in one or more vehicles. The auxiliary service data 860 may indicate a quantity of one or more auxiliary services available in one or more vehicles. If all the criteria are (or would be) satisfied, the vehicle matcher 820 may indicate a match and/or assign (and/or dispatch) the vehicle to satisfy the vehicle request. If not all of the criteria would be satisfied for any vehicle (within a geographical range, for example), the vehicle matcher 820 may indicate (e.g., offer, provide, etc.) one or more other options in some approaches.

Figure 9:
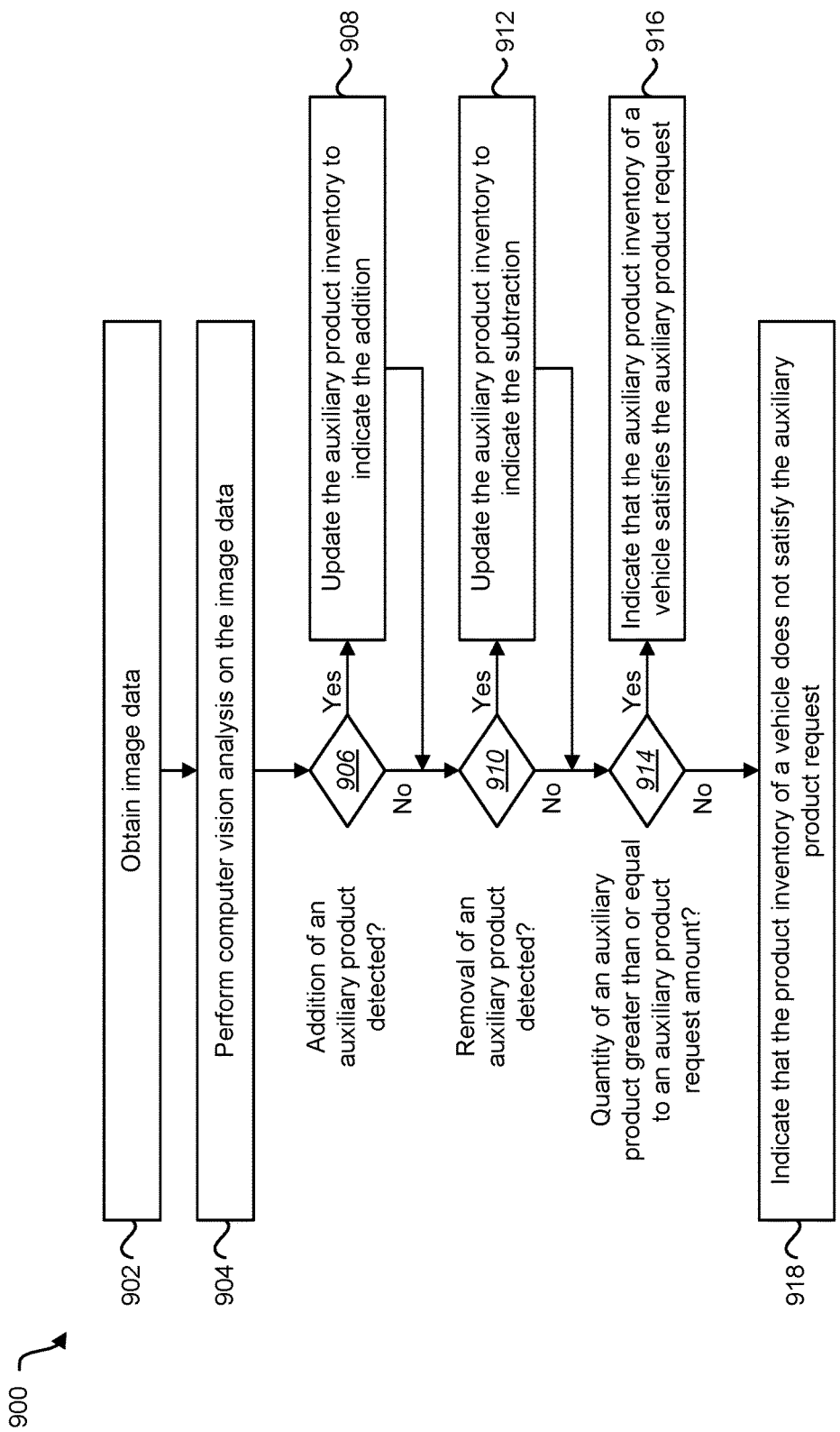
FIG. 9 is a flow diagram illustrating one configuration of a method for monitoring one or more quantities of one or more auxiliary products.

FIG. 9 is a flow diagram illustrating one configuration of a method 900 for monitoring one or more quantities of one or more auxiliary products (e.g., auxiliary product inventory). The method 900 may be performed by the electronic device 102, for example.

The electronic device 102 may obtain 902 image data (from an interior of at least one vehicle, for example). This may be accomplished as described above in connection with one or more of FIGS. 1-4, 6, and 8.

The electronic device 102 may perform 904 computer vision analysis on the image data. This may be accomplished as described in connection with one or more of FIGS. 1-4 and 6-8. For example, the electronic device 102 may perform object detection, object recognition, object tracking, and/or object classification on the image data.

The electronic device 102 may determine 906 whether addition of an auxiliary product is detected. For example, the electronic device 102 may determine 906 whether one or more additional auxiliary products (e.g., item, supply, ingredient, etc.) are detected, recognized, tracked, and/or classified from the image data. For example, if a number of auxiliary products detected in current image data (e.g., a current frame) is greater than a number of auxiliary products in previous image data (e.g., a previous frame), the electronic device 102 may determine 906 that addition of an auxiliary product has been detected. If addition of an auxiliary product is detected, the electronic device 102 may update 908 the product inventory to indicate the addition. For example, the electronic device 102 may increment the product inventory quantity for a number of auxiliary products that have been detected. For instance, the electronic device 102 may update a database of auxiliary products (e.g., a supply and/or ingredient inventory database).

If an addition of an auxiliary product is not detected or upon updating 908, the electronic device 102 may determine 910 whether removal of one or more auxiliary products (e.g., item, supply, ingredient, etc.) is detected. For example, the electronic device 102 may determine 910 whether fewer auxiliary products are detected, recognized, tracked, and/or classified from the image data. For example, if a number of auxiliary products detected in current image data (e.g., a current frame) is less than a number of auxiliary products in previous image data (e.g., a previous frame), the electronic device 102 may determine 910 that removal of an auxiliary product has been detected. If removal of an auxiliary product is detected, the electronic device 102 may update 912 the auxiliary product inventory to indicate the removal. For example, the electronic device 102 may decrement the product inventory quantity for a number of auxiliary products that have been detected. For instance, the electronic device 102 may update a database of auxiliary products (e.g., a supply and/or ingredient inventory database).

If a removal of an auxiliary product is not detected or upon updating 912, the electronic device 102 may determine 914 whether the quantity of an auxiliary product is greater than or equal to an auxiliary product request amount. If the quantity of the auxiliary product is greater than or equal to the auxiliary product request amount, the electronic device 102 may indicate 916 that the auxiliary product inventory of a vehicle satisfies (or would satisfy) the auxiliary product request. For example, the electronic device 102 (e.g., vehicle matcher 120) may indicate that the auxiliary product inventory of at least one vehicle satisfies the auxiliary product request. In some approaches, the electronic device 102 may assign and/or dispatch the vehicle. As described herein, whether to assign and/or dispatch a vehicle may be based on a combination of criteria (e.g., auxiliary product inventory, auxiliary service availability, distance to a pickup location, whether the vehicle may meet a time constraint, vehicle availability, whether one or more other vehicle aspects match the vehicle request, etc.) in some approaches.

If the quantity of the auxiliary product is not greater than or equal to (e.g., is less than) the auxiliary product request amount, the electronic device 102 may indicate 918 that the auxiliary product inventory of a vehicle does not satisfy (or would not satisfy) the auxiliary product request. For example, the electronic device 102 (e.g., vehicle matcher 120) may indicate that the auxiliary product inventory of at least one vehicle does not satisfy the auxiliary product request. It should be noted that a similar approach to that of the method 900 may be utilized to monitor availability, use, and/or consumption of one or more auxiliary services.

Figure 10:
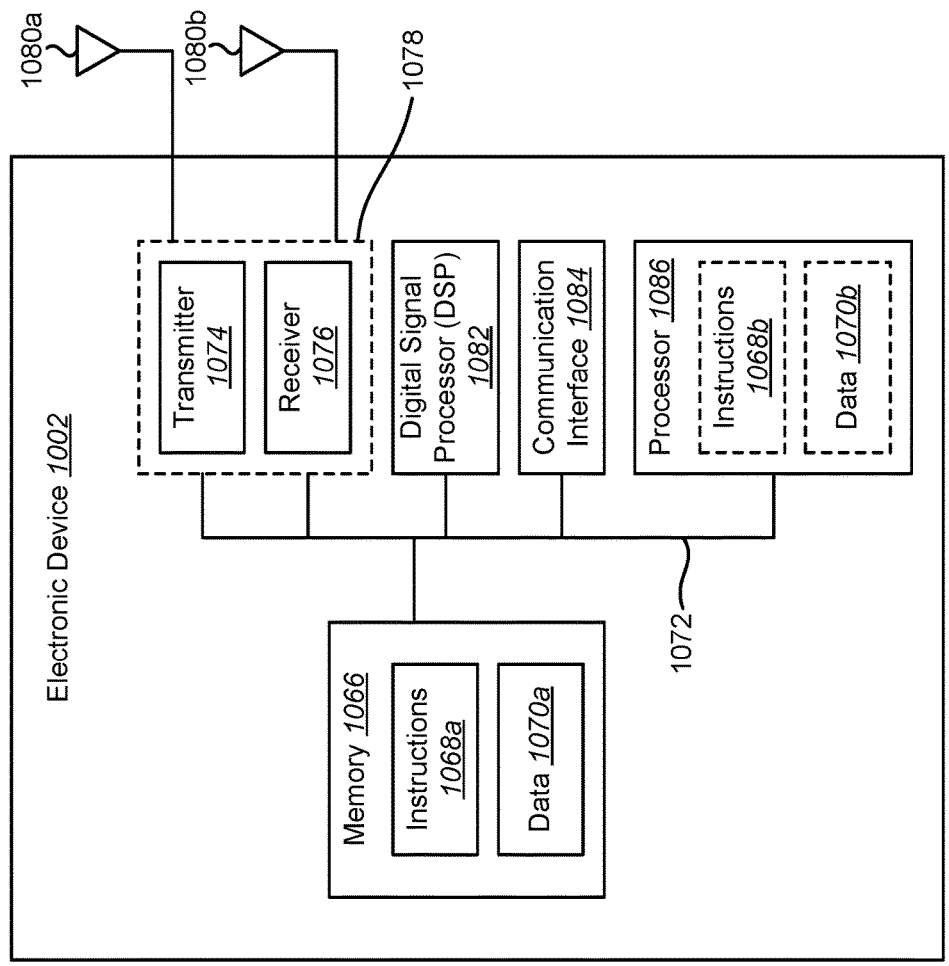
FIG. 10 illustrates certain components that may be included within an electronic device.

FIG. 10 illustrates certain components that may be included within an electronic device 1002. The electronic device 1002 may be an example of and/or may be implemented in accordance with the electronic device 102 described in connection with FIG. 1. The electronic device 1002 may be (or may be included within) a camera, video camcorder, digital camera, cellular phone, smart phone, computer (e.g., desktop computer, laptop computer, etc.), tablet device, media player, television, vehicle, automobile, surveillance camera, mounted camera, connected camera, robot, aircraft, drone, unmanned aerial vehicle (UAV), healthcare equipment, gaming console, personal digital assistant (PDA), set-top box, etc. The electronic device 1002 includes a processor 1086. The processor 1086 may be a general purpose single- or multi-chip microprocessor (e.g., an ARM), a special purpose microprocessor (e.g., a digital signal processor (DSP), image signal processor (ISP), etc.), a microcontroller, a programmable gate array, etc. The processor 1086 may be referred to as a central processing unit (CPU). Although just a single processor 1086 is shown in the electronic device 1002, in an alternative configuration, a combination of processors (e.g., an ARM and DSP) could be used.

The electronic device 1002 also includes memory 1066. The memory 1066 may be any electronic component capable of storing electronic information. The memory 1066 may be embodied as random access memory (RAM), read-only memory (ROM), magnetic disk storage media, optical storage media, flash memory devices in RAM, synchronous dynamic random-access memory (SDRAM), on-board memory included with the processor, EPROM memory, EEPROM memory, registers, and so forth, including combinations thereof.

Data 1070*a* and instructions 1068*a* may be stored in the memory 1066. The instructions 1068*a* may be executable by the processor 1086 to implement one or more of the methods 200, 400, 500, 600, 700, 900 described herein. Executing the instructions 1068*a* may involve the use of the data 1070*a* that is stored in the memory 1066. When the processor 1086 executes the instructions 1068, various portions of the instructions 1068*b* may be loaded onto the processor 1086, and various pieces of data 1070*b* may be loaded onto the processor 1086.

The electronic device 1002 may also include a transmitter 1074 and a receiver 1076 to allow transmission and reception of signals to and from the electronic device 1002. The transmitter 1074 and receiver 1076 may be collectively referred to as a transceiver 1078. One or multiple antennas 1080*a-b* may be electrically coupled to the transceiver 1078. The electronic device 1002 may also include (not shown)

multiple transmitters, multiple receivers, multiple transceivers and/or additional antennas.

The electronic device 1002 may include a digital signal processor (DSP) 1082. The electronic device 1002 may also include a communication interface 1084. The communication interface 1084 may enable one or more kinds of input and/or output. For example, the communication interface 1084 may include one or more ports and/or communication devices for linking other devices to the electronic device 1002. In some configurations, the communication interface 1084 may include the transmitter 1074 and/or the receiver 1076 (e.g., the transceiver 1078). Additionally or alternatively, the communication interface 1084 may include one or more other interfaces (e.g., touchscreen, keypad, keyboard, microphone, camera, etc.). For example, the communication interface 1084 may enable a user to interact with the electronic device 1002.

The various components of the electronic device 1002 may be coupled together by one or more buses, which may include a power bus, a control signal bus, a status signal bus, a data bus, etc. For the sake of clarity, the various buses are illustrated in FIG. 10 as a bus system 1072.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. A method performed by an electronic device, the method comprising:
obtaining an auxiliary product request or an auxiliary service request in conjunction with a vehicle request;

obtaining image data from an interior of at least one vehicle;
performing computer vision analysis on the image data, comprising processing the image data to classify one or more objects within a scene of the interior of the at least one vehicle; and
determining, based on the classification, whether the one or more objects satisfy the auxiliary product request or the auxiliary service request within the interior of the at least one vehicle.

2. The method of claim 1, further comprising determining an auxiliary product inventory or auxiliary service data based on the computer vision analysis, wherein the auxiliary product inventory indicates one or more items that are consumable by a passenger.

3. The method of claim 2, wherein an auxiliary product inventory indicates one or more auxiliary product types.

4. The method of claim 1, further comprising:
determining whether an auxiliary product inventory of the at least one vehicle satisfies the auxiliary product request; and
assigning a vehicle of the at least one vehicle to fulfill the vehicle request in a case that the auxiliary product inventory satisfies the auxiliary product request.

5. The method of claim 1, further comprising:
obtaining auxiliary service data associated with the at least one vehicle;
determining whether the auxiliary service data of the at least one vehicle satisfies the auxiliary service request; and
assigning a vehicle of the at least one vehicle to fulfill the vehicle request in a case that the auxiliary service data satisfies the auxiliary service request.

6. The method of claim 1, wherein the at least one vehicle includes multiple vehicles, and wherein the method further comprises ranking the vehicles based on an auxiliary product inventory or auxiliary service data.

7. The method of claim 6, further comprising:
obtaining the vehicle request with the auxiliary product request, a destination, and a time constraint;
obtaining vehicle availability data and vehicle location for each of the vehicles, wherein ranking the vehicles is further based on the auxiliary product request, the destination, and the time constraint;
determining whether any of the vehicles satisfies the auxiliary product request and the time constraint;
providing one or more options in a case that none of the vehicles satisfies the auxiliary product request or the time constraint; and
assigning a vehicle based on the vehicle location in a case that one or more of the vehicles satisfies the auxiliary product request and the time constraint.

8. The method of claim 1, further comprising:
monitoring an auxiliary product inventory based on computer vision by detecting addition or removal of one or more auxiliary products; and
updating the auxiliary product inventory based on the addition or removal of the one or more auxiliary products.

9. The method of claim 1, wherein an auxiliary product inventory indicates at least one of auxiliary product type, auxiliary product quantity, and auxiliary product quality.

10. An electronic device, comprising:
a processor;
memory in electronic communication with the processor;
instructions stored in the memory, the instructions being executable to:
obtain an auxiliary product request or an auxiliary service request in conjunction with a vehicle request;
obtain image data from an interior of at least one vehicle;
perform computer vision analysis on the image data, comprising processing the image data to classify one or more objects within a scene of the interior of the at least one vehicle; and
determine, based on the classification, whether the one or more objects satisfy the auxiliary product request or the auxiliary service request within the interior of the at least one vehicle.

11. The electronic device of claim 10, wherein the instructions are executable to determine an auxiliary product inventory or auxiliary service data based on the computer vision analysis, wherein the auxiliary product inventory indicates one or more items that are consumable by a passenger.

12. The electronic device of claim 11, wherein an auxiliary product inventory indicates one or more auxiliary product types.

13. The electronic device of claim 10, wherein the instructions are executable to:
determine whether an auxiliary product inventory of the at least one vehicle satisfies the auxiliary product request; and
assign a vehicle of the at least one vehicle to fulfill the vehicle request in a case that the auxiliary product inventory satisfies the auxiliary product request.

14. The electronic device of claim 10, wherein the instructions are executable to:
obtain auxiliary service data associated with the at least one vehicle;
determine whether the auxiliary service data of the at least one vehicle satisfies the auxiliary service request; and
assign a vehicle of the at least one vehicle to fulfill the vehicle request in a case that the auxiliary service data satisfies the auxiliary service request.

15. The electronic device of claim 10, wherein the at least one vehicle includes multiple vehicles, and wherein the instructions are executable to rank the vehicles based on an auxiliary product inventory or auxiliary service data.

16. The electronic device of claim 15, wherein the instructions are executable to:
obtain the vehicle request with the auxiliary product request, a destination, and a time constraint;
obtain vehicle availability data and vehicle location for each of the vehicles, wherein ranking the vehicles is further based on the auxiliary product request, the destination, and the time constraint;
determine whether any of the vehicles satisfies the auxiliary product request and the time constraint;
provide one or more options in a case that none of the vehicles satisfies the auxiliary product request or the time constraint; and
assign a vehicle based on the vehicle location in a case that one or more of the vehicles satisfies the auxiliary product request and the time constraint.

17. The electronic device of claim 10, wherein the instructions are executable to:
monitor an auxiliary product inventory based on computer vision by detecting addition or removal of one or more auxiliary products; and
update the auxiliary product inventory based on the addition or removal of the one or more auxiliary products.

18. The electronic device of claim 10, wherein an auxiliary product inventory indicates at least one of auxiliary product type, auxiliary product quantity, and auxiliary product quality.

19. A non-transitory tangible computer-readable medium storing computer executable code, comprising:
   code for causing an electronic device to obtain an auxiliary product request or an auxiliary service request in conjunction with a vehicle request;
   code for causing the electronic device to obtain image data from an interior of at least one vehicle;
   code for causing the electronic device to perform computer vision analysis on the image data, comprising code for causing the electronic device to process the image data to classify one or more objects within a scene of the interior of the at least one vehicle; and
   code for causing the electronic device to determine, based on the classification, whether the one or more objects satisfy the auxiliary product request or the auxiliary service request within the interior of the at least one vehicle.

20. The computer-readable medium of claim 19, wherein the executable code comprises code for causing the electronic device to determine an auxiliary product inventory or auxiliary service data based on the computer vision analysis, wherein the auxiliary product inventory indicates one or more items that are consumable by a passenger.

21. The computer-readable medium of claim 19, wherein the executable code comprises:
   code for causing the electronic device to determine whether an auxiliary product inventory of the at least one vehicle satisfies the auxiliary product request; and
   code for causing the electronic device to assign a vehicle of the at least one vehicle to fulfill the vehicle request in a case that the auxiliary product inventory satisfies the auxiliary product request.

22. The computer-readable medium of claim 19, wherein the executable code comprises:
   code for causing the electronic device to obtain auxiliary service data associated with the at least one vehicle;
   code for causing the electronic device to determine whether the auxiliary service data of the at least one vehicle satisfies the auxiliary service request; and
   code for causing the electronic device to assign a vehicle of the at least one vehicle to fulfill the vehicle request in a case that the auxiliary service data satisfies the auxiliary service request.

23. The computer-readable medium of claim 19, wherein the at least one vehicle includes multiple vehicles, and wherein the executable code comprises code for causing the electronic device to rank the vehicles based on an auxiliary product inventory or auxiliary service data.

24. The computer-readable medium of claim 19, wherein the executable code comprises:
   code for causing the electronic device to monitor an auxiliary product inventory based on computer vision by detecting addition or removal of one or more auxiliary products; and
   code for causing the electronic device to update the auxiliary product inventory based on the addition or removal of the one or more auxiliary products.

25. An apparatus, comprising:
   means for obtaining an auxiliary product request or an auxiliary service request in conjunction with a vehicle request;
   means for obtaining image data from an interior of at least one vehicle;
   means for performing computer vision analysis on the image data, comprising means for processing the image data to classify one or more objects within a scene of the interior of the at least one vehicle; and
   means for determining, based on the classification, whether the one or more objects satisfy the auxiliary product request or the auxiliary service request within the interior of the at least one vehicle.

26. The apparatus of claim 25, comprising means for determining an auxiliary product inventory or auxiliary service data based on the computer vision analysis, wherein the auxiliary product inventory indicates one or more items that are consumable by a passenger.

27. The apparatus of claim 25, comprising:
   means for determining whether an auxiliary product inventory of the at least one vehicle satisfies the auxiliary product request; and
   means for assigning a vehicle of the at least one vehicle to fulfill the vehicle request in a case that the auxiliary product inventory satisfies the auxiliary product request.

28. The apparatus of claim 25, comprising:
   means for obtaining auxiliary service data associated with the at least one vehicle;
   means for determining whether the auxiliary service data of the at least one vehicle satisfies the auxiliary service request; and
   means for assigning a vehicle of the at least one vehicle to fulfill the vehicle request in a case that the auxiliary service data satisfies the auxiliary service request.

29. The apparatus of claim 25, wherein the at least one vehicle includes multiple vehicles, and wherein the apparatus comprises means for ranking the vehicles based on an auxiliary product inventory or auxiliary service data.

30. The apparatus of claim 25, comprising:
   means for monitoring an auxiliary product inventory based on computer vision by detecting addition or removal of one or more auxiliary products; and
   means for updating the auxiliary product inventory based on the addition or removal of the one or more auxiliary products.

* * * * *